United States Patent
Border et al.

(10) Patent No.: US 7,219,158 B2
(45) Date of Patent: May 15, 2007

(54) METHOD AND SYSTEM FOR IMPROVING NETWORK PERFORMANCE USING A PERFORMANCE ENHANCING PROXY

(75) Inventors: John Border, Poolesville, MD (US); Ken Burrell, Rockville, MD (US)

(73) Assignee: Hughes Network Systems LLC, Germantown, MD (US)

( * ) Notice: Subject to any disclaimer, the term of this patent is extended or adjusted under 35 U.S.C. 154(b) by 816 days.

(21) Appl. No.: 09/903,832

(22) Filed: Jul. 12, 2001

(65) Prior Publication Data

US 2002/0059435 A1  May 16, 2002

Related U.S. Application Data

(60) Provisional application No. 60/225,630, filed on Aug. 15, 2000, provisional application No. 60/220,026, filed on Jul. 21, 2000.

(51) Int. Cl.
*G06F 15/173* (2006.01)
(52) U.S. Cl. ............... 709/240; 709/247; 370/521
(58) Field of Classification Search ........ 709/217–219, 709/227–235; 370/229–235; 710/68
See application file for complete search history.

(56) References Cited

U.S. PATENT DOCUMENTS

| | | | | |
|---|---|---|---|---|
| 5,309,562 A | * | 5/1994 | Li ............................... | 709/237 |
| 6,023,456 A | * | 2/2000 | Chapman et al. ............. | 370/252 |
| 6,038,216 A | * | 3/2000 | Packer ........................ | 370/231 |
| 6,038,594 A | * | 3/2000 | Puente et al. ................ | 709/217 |
| 6,061,341 A | * | 5/2000 | Andersson et al. .......... | 370/338 |
| 6,151,332 A | * | 11/2000 | Gorsuch et al. ............. | 370/466 |

(Continued)

FOREIGN PATENT DOCUMENTS

EP    0 903 905 A2    9/1998

(Continued)

OTHER PUBLICATIONS

J.S. Baras, S. Corson, S. Papademetriou, I. Secka, and N. Suphasindhu. "Fast Asymmetric Internet Over Wireless Satellite-Terrestrial Networks." Milcom 97 Proceedings. Nov. 3-5, 1997. Annual Military Communications Conference. IEEE. pp. 372-377.*

(Continued)

*Primary Examiner*—Jason Cardone
*Assistant Examiner*—Jeffrey R Swearingen
(74) *Attorney, Agent, or Firm*—C. Plastrik

(57) ABSTRACT

A network apparatus for performing functions to enhance performance of a communication network is provided. The network apparatus includes a spoofing module that is configured to selectively spoof a multiple connections associated with a multiple hosts based upon corresponding spoofing criteria and to provide local acknowledgement of received messages over the connections. Additionally, the network apparatus includes a connection module that multiplexes the connections over a common backbone connection, and a prioritization module that prioritizes access to the backbone connection based upon prioritization criteria. Further, the network apparatus includes a path selection module that determines a path to transmit the received messages based upon path selection criteria. The spoofing module allocates a connection control block corresponding to a spoofed connection. Each of the connection control blocks stores information related to the connections. The above arrangement has particular applicability to a bandwidth constrained communication system, such as a satellite network.

36 Claims, 18 Drawing Sheets

U.S. PATENT DOCUMENTS

| | | | | |
|---|---|---|---|---|
| 6,298,041 B1 * | 10/2001 | Packer | ...................... | 370/231 |
| 6,327,626 B1 * | 12/2001 | Schroeder et al. | .......... | 709/236 |
| 6,526,281 B1 * | 2/2003 | Gorsuch et al. | ......... | 455/452.1 |
| 6,640,248 B1 * | 10/2003 | Jorgensen | ................... | 709/226 |
| 6,701,370 B1 * | 3/2004 | Dillon | ........................ | 709/230 |
| 6,820,132 B1 * | 11/2004 | Puente et al. | ............... | 709/238 |
| 6,823,387 B1 * | 11/2004 | Srinivas | ...................... | 709/227 |
| 6,934,255 B1 * | 8/2005 | Toporek et al. | ............. | 709/203 |

FOREIGN PATENT DOCUMENTS

| | | | |
|---|---|---|---|
| JP | 0 903 905 | * | 9/1998 |
| WO | WO 95/34153 | * | 12/1995 |
| WO | WO 01/65805 | * | 9/2001 |
| WO | WO 01/65805 A2 | | 9/2001 |

OTHER PUBLICATIONS

J. Border et al. "Performance Enhancing Proxies." Internet Engineering Task Force Internet Draft. Jun. 25, 1999. p. 1-26.*

O. Spatscheck et al. "Optimizing TCP Forwarder Performance." IEEE/ACM Transactions on Networking, vol. 8 No. 2, Apr. 2000. pp. 146-157.*

J. Ishac et al. "On the Performance of TCP Spoofing in Satellite Networks." Military Communications Conference, 2001. MILCOM 2001. Communications for Network-Centric Operations: Creating the Information Force. IEEE, vol. 1 Oct. 2001. pp. 700-704.*

J.S. Baras, S. Corson, S. Papademetriou, I. Secka and N. Suphasindhu. "Fast Asymmetric Internet Over Wireless Satellite-Terrestrial Networks." MILCOM 97 Proceedings. Nov. 3-5, 1997. Annual Military Communications Conference. IEEE. pp. 372-377.*

Jean Walrand. Communication Networks: A First Course. Boston: McGraw-Hill, 1998. Second Edition. Chapter 8: Security and Compression. 238-269.*

The "Controlling the Assault of Non-Solicited Pornography and Marketing Act of 2003" or the "CAN-SPAM Act of 2003". S.877, 108th Congress of the United States of America. Enacted Jan. 1, 2004.*

J.S. Baras, S. Corson, S. Papademetriou, I. Secka, and N. Suphasindhu, "Fast Asymmetric Internet Over Wireless Satellite-Terrestrial Networks", Milcom 97 Proceedings. Nov. 3-5, 1997, Annual Military Communications Conference, New York, NY: IEEE, US, vol. 1, Nov. 3, 1997, XP 000799704, pp. 372-377.

J. Border et al., "Performance Enhancing Proxies", Internet Engineering Task Force Internet Draft, Jun. 25, 1999, XP002198915, pp. 1-26.

* cited by examiner

TCP CONNECTION

METHOD AND SYSTEM FOR IMPROVING NETWORK PERFORMANCE USING A PERFORMANCE ENHANCING PROXY

CROSS-REFERENCES TO RELATED APPLICATION

This application is related to and claims the benefit of priority to: (i) U.S. Provisional Patent Application (Ser. No. 60/220,026), filed Jul. 21, 2000, entitled "Performance Enhancing Proxy," and (ii) U.S. Provisional Patent Application (Ser. No. 60/225,630), filed Aug. 15, 2000, entitled "Performance Enhancing Proxy"; all of which are incorporated herein by reference in their entirety.

BACKGROUND OF THE INVENTION

1. Field of the Invention

The present invention relates to a communication system, and is more particularly related to a proxy architecture for improving network performance.

2. Discussion of the Background

The entrenchment of data networking into the routines of modern society, as evidenced by the prevalence of the Internet, particularly the World Wide Web, has placed ever-growing demands on service providers to continually improve network performance. To meet this challenge, service providers have invested heavily in upgrading their networks to increase system capacity (i.e., bandwidth). In many circumstances, such upgrades may not be feasible economically or the physical constraints of the communication system does not permit simply "upgrading." Accordingly, service providers have also invested in developing techniques to optimize the performance of their networks. Because much of today's networks are either operating with or are required to interface with the Transmission Control Protocol/Internet Protocol (TCP/IP) suite, attention has been focused on optimizing TCP/IP based networking operations.

As the networking standard for the global Internet, TCP/IP has earned such acceptance among the industry because of its flexibility and rich heritage in the research community. The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 17. As illustrated, the link layer (or the network interface layer) 10 includes device drivers in the operating system and any corresponding network interface cards. Together, the device driver and the interface cards handle hardware details of physically interfacing with any cable or whatever type of media that is being used. The network layer (also referred to as the Internet layer) 12 handles the movement of packets around the network. Routing of packets, for example, takes place at the network layer 12. IP, Internet control message protocol (ICMP), and Internet group management protocol (IGMP) may provide the network layer in the TCP/IP protocol suite. The transport layer 14 provides a flow of data between two hosts, for the application layer 16 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 16 into appropriately sized segments for the network layer 12 below, acknowledging received packets, setting timeouts to make certain the other end acknowledges packets that are sent, and so on. Because this reliable flow of data is provided by the transport layer 14, the application layer 16 is isolated from these details. UDP, on the other hand, provides a much simpler service to the application layer 16. UDP just sends packets of data called datagrams from one host to another, with no guarantee that the datagrams will reach their destination. Any desired reliability must be added by a higher layer, such as the application layer 16.

The application layer 16 handles the details of the particular application. There are many common TCP/IP applications that almost every implementation provides, including telnet for remote log-in, the file transfer protocol (FTP), the simple mail transfer protocol (SMTP) or electronic mail, the simple network management protocol (SNMP), the hypertext transfer protocol (HTTP), and many others.

As mentioned, TCP provides reliable, in-sequence delivery of data between two IP hosts. The IP hosts set up a TCP connection, using a conventional TCP three-way handshake and then transfer data using a window based protocol with the successfully received data acknowledged.

To understand where optimizations may be made, it is instructive to consider a typical TCP connection establishment. FIG. 18 illustrates an example of the conventional TCP three-way handshake between IP hosts 20 and 22. First, the IP host 20 that wishes to initiate a transfer with IP host 22, sends a synchronize (SYN) signal to IP host 22. The IP host 22 acknowledges the SYN signal from IP host 20 by sending a SYN acknowledgement (ACK). The third step of the conventional TCP three-way handshake is the issuance of an ACK signal from the IP host 20 to the other IP host 22. At this point, IP host 22 is ready to receive the data from IP host 20 (and vice versa). After all the data has been delivered, another handshake (similar to the handshake described to initiate the connection) is used to close the TCP connection.

TCP was designed to be very flexible and to work over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses. Such flexibility is achieved at the cost of sub-optimal operation in a number of environments vis-à-vis a tailored protocol. The tailored protocol, which is usually proprietary in nature, may be more optimal, but greatly lacks flexibility in terms of networking environments and interoperability.

An alternative to a tailored protocol is the use of performance enhancing proxies (PEPs), to perform a general class of functions termed "TCP spoofing," in order to improve TCP performance over impaired (i.e., high latency or high error rate) links. TCP spoofing involves an intermediate network device (the performance enhancing proxy (PEP)) intercepting and altering, through the addition and/or deletion of TCP segments, the behavior of the TCP connection in an attempt to improve its performance.

Conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of TCP connections either by using larger windows over the link or by using compression to reduce the amount of data which needs to be sent, or both.

Many TCP PEP implementations are based on TCP ACK manipulation. These may include TCP ACK spacing where ACKs which are bunched together are spaced apart, local TCP ACKs, local TCP retransmissions, and TCP ACK filtering and reconstruction. Other PEP mechanisms include tunneling, compression, and priority-based multiplexing.

Based on the foregoing, there is a clear need for improved approaches to optimizing network performance, while achieving flexibility. There is also a need to enhance network performance, without a costly infrastructure investment. There is also a need to employ a network performance enhancing mechanism that complies with existing standards to facilitate rapid deployment. There is a further need to simplify the receiver design. Therefore, an approach for optimizing network performance using a proxy architecture is highly desirable.

SUMMARY OF THE INVENTION

The present invention addresses the above stated needs by providing a performance enhancing proxy (PEP) that performs a number of network performance enhancing functions.

According to one aspect of the invention, a network apparatus for performing functions to enhance performance of a communication network is provided. The network apparatus includes a spoofing module that is configured to selectively spoof a plurality of connections associated with a plurality of hosts based upon corresponding spoofing criteria and to provide local acknowledgement of received messages over the connections. Additionally, the network apparatus includes a connection module that is configured to multiplex the plurality of connections over a common backbone connection, and a prioritization module that is configured to prioritize access to the backbone connection based upon prioritization criteria. Further, the network apparatus includes a path selection module that is configured to determine a path among a plurality of paths to transmit the received messages based upon path selection criteria. The spoofing module is configured to allocate a connection control block among a plurality of connection control blocks corresponding to a spoofed connection. Each of the plurality of connection control blocks stores information related to the plurality of connections. The above arrangement advantageously provides improved system performance.

According to another aspect of the invention, a method for performing functions to enhance performance of a communication network is provided. The method includes selectively spoofing a plurality of connections associated with a plurality of hosts based upon corresponding spoofing criteria and providing local acknowledgement of received messages over the connections. The step of selectively spoofing includes allocating a connection control block among a plurality of connection control blocks corresponding to a spoofed connection. Each of the plurality of connection control blocks stores information related to the plurality of connections. The method also includes multiplexing the plurality of connections over a common backbone connection, prioritizing access to the backbone connection based upon prioritization criteria, and determining a path among a plurality of paths to transmit the received messages based upon path selection criteria. The above arrangement advantageously improves system throughput and system flexibility of a communication system.

According to one aspect of the invention, a network apparatus for performing functions to enhance performance of a communication network is disclosed. The network apparatus includes means for selectively spoofing a plurality of connections associated with a plurality of hosts based upon corresponding spoofing criteria. The spoofing means includes means for allocating a connection control block among a plurality of connection control blocks corresponding to a spoofed connection. Each of the plurality of connection control blocks stores information related to the plurality of connections. The network apparatus also includes means for providing local acknowledgement of received messages over the connections, means for multiplexing the plurality of connections over a common backbone connection, and means for prioritizing access to the backbone connection based upon prioritization criteria. Further, the network apparatus includes means for determining a path among a plurality of paths to transmit the received messages based upon path selection criteria. The above arrangement advantageously provides enhanced system performance.

According to another aspect of the invention, a computer-readable medium carrying one or more sequences of one or more instructions for performing functions to enhance performance of a communication network is disclosed. The one or more sequences of one or more instructions include instructions which, when executed by one or more processors, cause the one or more processors to perform the step of selectively spoofing a plurality of connections associated with a plurality of hosts based upon corresponding spoofing criteria. The step of selectively spoofing includes allocating a connection control block among a plurality of connection control blocks corresponding to a spoofed connection. Each of the plurality of connection control blocks stores information related to the plurality of connections. Other steps include providing local acknowledgement of received messages over the connections, multiplexing the plurality of connections over a common backbone connection, prioritizing access to the backbone connection based upon prioritization criteria, determining a path among a plurality of paths to transmit the received messages based upon path selection criteria. The above arrangement advantageously minimizes network latency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Although the present invention is discussed with respect to the Internet and the TCP/IP protocol suite, the present invention has applicability to other packet switched networks and equivalent protocols.

Figure 1:
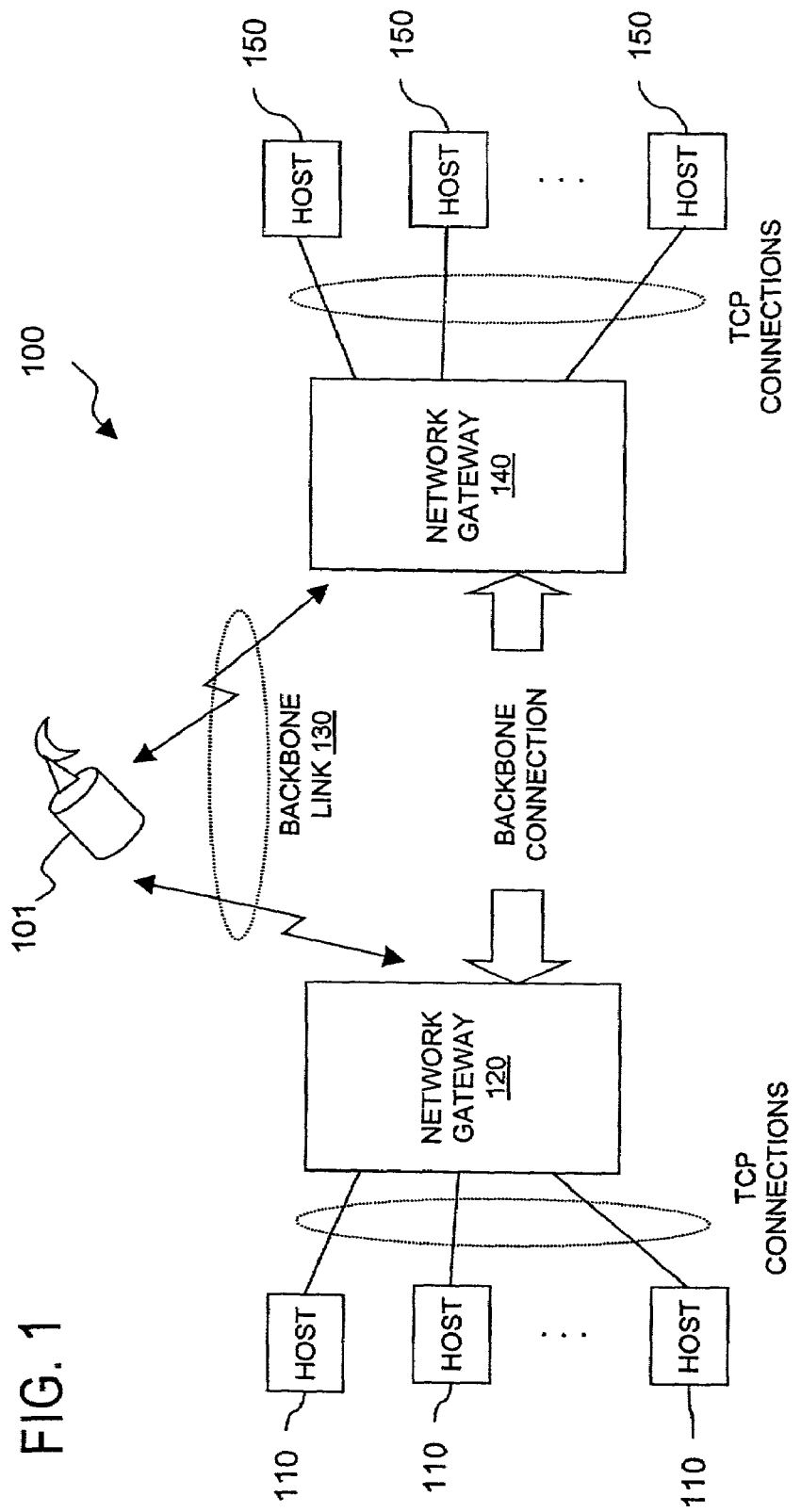
FIG. 1 is a diagram of a communication system in which the performance enhancing proxy (PEP) of the present invention is implemented.

FIG. 1 illustrates an exemplary network 100 in which the performance enhancing proxy (PEP) of the present invention may be utilized. The network 100 in FIG. 1 includes one or more hosts 110 connected to a network gateway 120 via TCP connections. The network gateway 120 is connected to another network gateway 140 via a backbone connection on a backbone link 130. As seen in FIG. 1, the backbone link 130, in an exemplary embodiment, is shown as a satellite link that is established over a satellite 101; however, it is recognized by one of ordinary skill in the art that other network connections may be implemented. For example, these network connections may be established over a wireless communications system, in general, (e.g., radio networks, cellular networks, etc.) or a terrestrial communications system. The network gateway 140 is further connected to a second group of hosts 150, also via TCP connections. In the arrangement illustrated in FIG. 1, the network gateways 120,140 facilitate communication between the groups of hosts 110, 150.

The network gateways 120, 140 facilitate communication between the two groups of hosts 110, 150 by performing a number of performance enhancing functions. These network gateways 120, 140 may perform selective TCP spoofing, which allows flexible configuration of the particular TCP connections that are to be spoofed. Additionally, gateways 120, 140 employ a TCP three-way handshake, in which the TCP connections are terminated at each end of the backbone link 130. Local data acknowledgements are utilized by the network gateways 120, 140, thereby permitting the TCP windows to increase at local speeds.

The network gateway 120, 140 further multiplexes multiple TCP connections across a single backbone connection; this capability reduces the amount of acknowledgement traffic associated with the data from multiple TCP connections, as a single backbone connection acknowledgement may be employed. The multiplexing function also provides support for high throughput TCP connections, wherein the backbone connection protocol is optimized for the particular backbone link that is used. The network gateways 120, 140 also support data compression over the backbone link 130 to reduce the amount of traffic to be sent, further leveraging the capabilities of the backbone connection. Further, the network gateways 120, 140 utilize data encryption in the data transmission across the backbone link 130 to protect data privacy, and provide prioritized access to backbone link 130 capacity on a per TCP connection basis. Each of the network gateways 120, 140 may select a particular path for the data associated with a connection to flow. The above capabilities of the network gateways 120, 140 are more fully described below.

Figure 2:
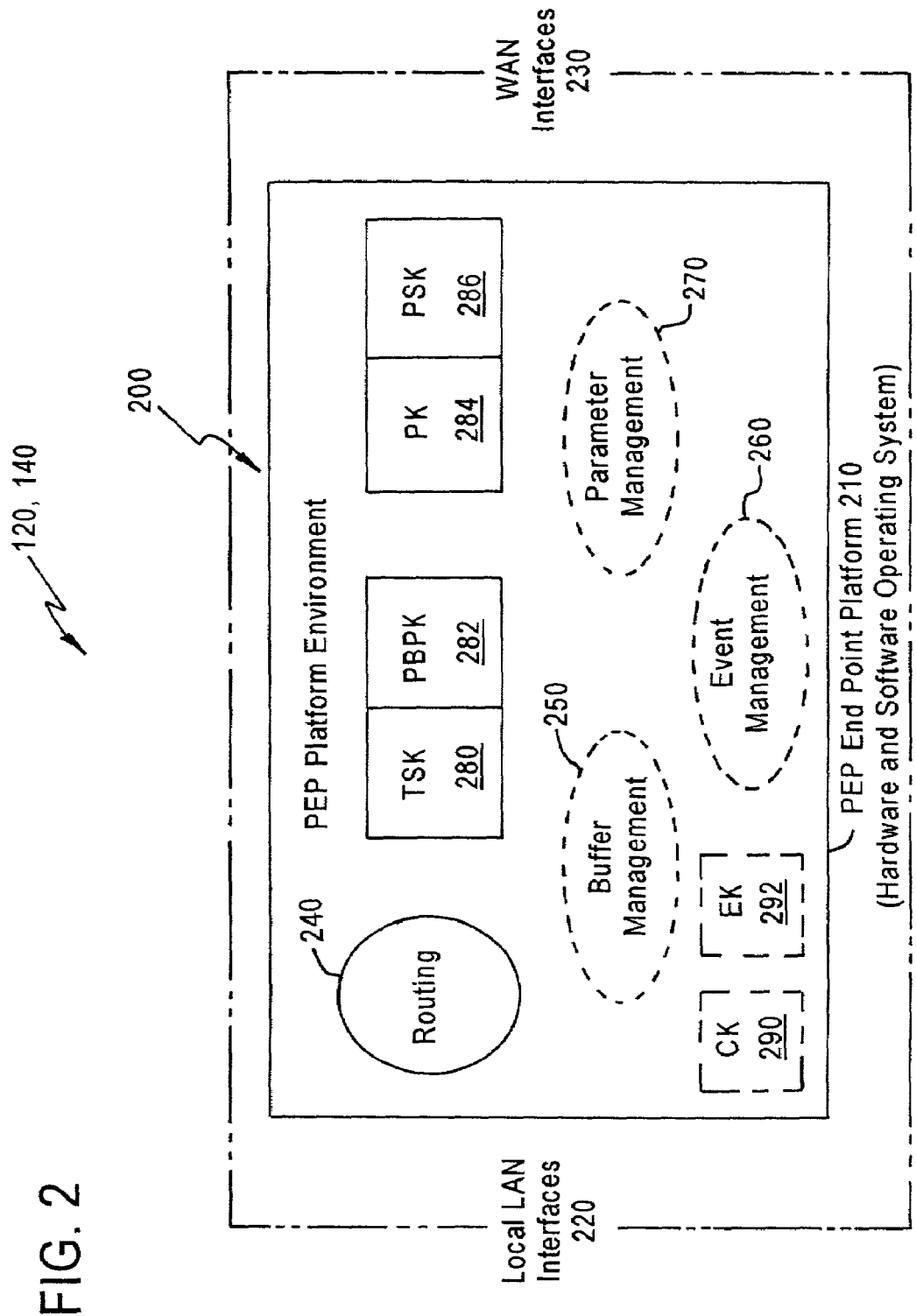
FIG. 2 is a diagram of a PEP end point platform environment, according to an embodiment of the present invention.

FIG. 2 illustrates a performance enhancing proxy (PEP) 200 as implemented in a network gateway 120, 140, according to one embodiment of the present invention. In this embodiment, the PEP 200 has a platform environment 210, which includes the hardware and software operating system. The PEP 200 also includes local area network (LAN) interfaces 220 and wide area network (WAN) interfaces 230. In the example in FIG. 1, the network gateway 120 may establish the TCP connections with the IP hosts 110, via a local LAN interface 220 and may establish the backbone connection with the network gateway 140 via a WAN interface 230. The PEP platform environment 210 may also include general functional modules: routing module 240, buffer management module 250, event management module 260, and parameter management module 270. As illustrated in FIG. 2, the network gateway also includes a TCP spoofing kernel (TSK) 280, a backbone protocol kernel (BPK) 282, a prioritization kernel (PK) 284, and a path selection kernel (PSK) 286. These four kernels essentially make up the functionality of the performance enhancing proxy 200.

The platform environment 210 performs a number of functions. One such function is to shield the various PEP kernels 280, 282, 284, 286 from implementation specific constraints. That is, the platform environment 210 performs functions that the various PEP kernels 280, 282, 284, 286 cannot perform directly because the implementation of the function is platform specific. This arrangement has the advantageous effect of hiding platform specific details from the PEP kernels 280, 282, 284, 286, making the PEP kernels more portable. An example of a platform specific function is the allocation of a buffer. In some platforms, buffers are created as they are needed, while in other platforms, buffers are created at start-up and organized into linked lists for later use. It is noted that platform specific functions are not limited to functions generic to all of the kernels 280, 282, 284, 286. A function specific to a particular kernel, for example, the allocation of a control block for TCP spoofing, may also be implemented in the platform environment to hide platform specific details from the kernel.

Additionally, the platform environment 210 may provide the task context in which the PEP kernels 280, 282, 284, 286 run. In one exemplary embodiment, all PEP kernels 280, 282, 284, 286 can run in the same task context for efficiency. However, this is not required.

Furthermore, the platform environment 210, in an exemplary embodiment, provides an interface between the PEP functionality (embodied in kernels 280, 282, 284, 286) and the other functionality of the network gateway 120, 140. The platform environment 210 may provide the interface between the PEP functionality and the routing function 240, as seen in FIG. 2. It is noted that the platform specific functions illustrated in FIG. 2 are examples and are not considered an exhaustive list. It is further noted that the PEP kernels shown touching each other (280, 282 and 284, 286) in FIG. 2 may have a direct procedural interface to each other. Further, the kernels 280, 282, 284, 286 may include direct interfaces to improve performance, as opposed to routing everything through the platform environment 210 (as shown in FIG. 2).

In addition to the PEP kernels 280, 282, 284, and 286, the PEP end point platform 210 may utilize a data compression kernel (CK) 290 and an encryption kernel (EK) 292. These kernels 280, 282, 284, 286, 290, and 292, as described above, facilitate communication between the two groups of hosts 110, 150, by performing a variety of performance enhancing functions, either singly or in combination. These performance enhancing functions include selective TCP spoofing, three-way handshake spoofing, local data acknowledgement, TCP connection to backbone connection multiplexing, data compression/encryption, prioritization, and path selection.

Selective TCP Spoofing is performed by the TSK 280 and includes a set of user configurable rules that are used to determine which TCP connections should be spoofed. Selective TCP spoofing improves performance by not tying up TCP spoofing-related resources, such as buffer space, control blocks, etc., for TCP connections for which the user has determined that spoofing is not beneficial or required and by supporting the use of tailored parameters for TCP connections that are spoofed.

In particular, the TSK 280 discriminates among the various TCP connections based on the applications using them. That is, TSK 280 discriminates among these TCP connections to determine which connection should be spoofed as well as the manner in which the connection is spoofed; e.g., whether to spoof the three-way handshake, the particular timeout parameters for the spoofed connections, etc. TCP spoofing is then performed only for those TCP connections that are associated with applications for which high throughput or reduced connection startup latency (or both) is required. As a result, the TSK 280 conserves TCP spoofing resources for only those TCP connections for which high throughput or reduced connection startup latency (or both) is required. Further, the TSK 280 increases the total number of TCP connections which can be active before running out of TCP spoofing resources, since any active TCP connections which do not require high throughput are not allocated resources.

One criterion for identifying TCP connections of applications for which TCP spoofing should and should not be performed is the TCP port number field contained in the TCP packets being sent. In general, unique port numbers are assigned to each type of application. Which TCP port numbers should and should not be spoofed can be stored in the TSK 280. The TSK 280 is also re-configurable to allow a user or operator to reconfigure the TCP port numbers which should and should not be spoofed. The TSK 280 also permits a user or operator to control which TCP connections are to be spoofed based on other criteria. In general, a decision on whether to spoof a TCP connection may be based on any field within a TCP packet. The TSK 280 permits a user to specify which fields to examine and which values in these fields identify TCP connections that should or should not be spoofed. Another example of a potential use for this capability is for the user or operator to select the IP address of the TCP packet in order to control for which users TCP spoofing is performed. The TSK 280 also permits a user to look at multiple fields at the same time. As a result, the TSK 280 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule: Destination IP address; Source IP address; TCP port numbers (which may apply to both the TCP destination and source port numbers); TCP options; and IP differentiated services (DS) field. However, as indicated above, other fields within the TCP packet may be used.

As discussed above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the TSK 280 can apply rules in the order specified by the operator, taking the action of the first rule that matches. A default rule may also be set which defines the action to be taken for TCP connections which do not match any of the defined rules. The set of rules selected by the operator may be defined in a selective TCP spoofing selection profile.

As an example, assuming sufficient buffer space has been allocated to spoof five TCP connections, if four low speed applications (i.e., applications which, by their nature, do not require high speed) bring up connections along with one high speed application, the high speed connection has access to only ⅕ of the available spoofing buffer space. Further, if five low speed connections are brought up before the high speed connection, the high speed connection cannot be spoofed at all. Using the TSK 280 selective spoofing mechanism, the low speed connections are not allocated any spoofing buffer space. Therefore, the high speed connection always has access to all of the buffer space, improving its performance with respect to an implementation without the selective TCP spoofing feature of the TSK 280.

The TSK 280 also facilitates spoofing of the conventional three-way handshake. Three-Way Handshake Spoofing involves locally responding to a connection request to bring up a TCP connection in parallel with forwarding the connection requests across the backbone link 130 (FIG. 1). This allows the originating IP host (for example, 110) to reach the point of being able to send the data it must send at local speeds, i.e. speeds that are independent of the latency of the backbone link 130. Three-way Handshake Spoofing allows the data that the IP host 110 needs to send to be sent to the destination IP host 150 without waiting for the end-to-end establishment of the TCP connection. For backbone links 130 with high latency, this significantly reduces the time it takes to bring up the TCP connection and, more importantly, the overall time it takes to get a response (from an IP host 150) to the data the IP host 110 sends.

A specific example in which this technique is useful relates to an Internet web page access application. With three-way handshake spoofing, an IP host's request to retrieve a web page can be on its way to a web server without waiting for the end-to-end establishment of the TCP connection, thereby reducing the time it takes to download the web page.

With Local Data Acknowledgement, the TSK 280 in the network gateway 120 (for example) locally acknowledges data segments received from the IP host 110. This allows the sending IP host 110 to send additional data immediately. More importantly, TCP uses received acknowledgements as signals for increasing the current TCP window size. As a result, local sending of the acknowledgements allows the sending IP host 110 to increase it TCP window at a much faster rate than supported by end to end TCP acknowledgements. The TSK 280 (the spoofer) takes on the responsibility for reliable delivery of the data which it has acknowledged.

In the BPK 282, multiple TCP connections are multiplexed onto and carried by a single backbone connection. This improves system performance by allowing the data for multiple TCP connections to be acknowledged by a single backbone connection acknowledgement (ACK), significantly reducing the amount of acknowledgement traffic required to maintain high throughput across the backbone link 130. In addition, the BPK 282 selects a backbone connection protocol that is optimized to provide high throughput for the particular link. Different backbone connection protocols can be used by the BPK 282 with different backbone links without changing the fundamental TCP spoofing implementation. The backbone connection protocol selected by the BPK 282 provides appropriate support for reliable, high speed delivery of data over the backbone link 130, hiding the details of the impairments (for example high latency) of the link from the TCP spoofing implementation.

The multiplexing by the BPK 282 allows for the use of a backbone link protocol which is individually tailored for use with the particular link and provides a technique to leverage the performance of the backbone link protocol with much less dependency upon the individual performance of the TCP connections being spoofed than conventional methods. Further, the ability to tailor the backbone protocol for different backbone links makes the present invention applicable to many different systems.

The PEP 200 may optionally include a data compression kernel 290 for compressing TCP data and an encryption kernel 292 for encrypting TCP data. Data compression increases the amount of data that can be carried across the backbone connection. Different compression algorithms can be supported by the data compression kernel 290 and more than one type of compression can be supported at the same time. The data compression kernel 290 may optionally apply compression on a per TCP connection basis, before the TCP data of multiple TCP connections is multiplexed onto the backbone connection or on a per backbone connection basis, after the TCP data of multiple TCP connections has been multiplexed onto the backbone connection. Which option is used is dynamically determined based on user configured rules and the specific compression algorithms being utilized. Exemplary data compression algorithms are disclosed in U.S. Pat. Nos. 5,973,630, 5,955,976, the entire contents of which are hereby incorporated by reference. The encryption kernel 292 encrypts the TCP data for secure transmission across the backbone link 130. Encryption may be performed by any conventional technique. It is also understood that the corresponding spoofer (in the example outlined above, the network gateway 140) includes appropriate kernels for decompression and decryption, both of which may be performed by any conventional technique.

The PK 284 provides prioritized access to the backbone link capacity. For example, the backbone connection can actually be divided into N (N>1) different sub-connections, each having a different priority level. In one exemplary embodiment, four priority levels can be supported. The PK 284 uses user-defined rules to assign different priorities, and therefore different sub-connections of the backbone connection, to different TCP connections. It should be noted that PK 284 may also prioritize non-TCP traffic (e.g., UDP (User Datagram Protocol) traffic) before sending the traffic across the backbone link 130.

The PK 284 also uses user-defined rules to control how much of the backbone link 130 capacity is available to each priority level. Exemplary criteria which can be used to determine priority include the following: Destination IP address; Source IP address; IP next protocol; TCP port numbers (which may apply to both the TCP destination and source port numbers); UDP port numbers (which may apply to both the UDP destination and source port numbers); and IP differentiated services (DS) field. The type of data in the TCP data packets may also be used as a criterion. For example, video data could be given highest priority. Mission critical data could also be given high priority. As with selective TCP spoofing, any field in the IP packet can be used by PK 284 to determine priority. However, it should be noted that under some scenarios the consequence of using such a field may cause different IP packets of the same flow (e.g., TCP connection) to be assigned different priorities; these scenarios should be avoided.

As mentioned above, in addition to supporting selective prioritization rules for each of these criteria, AND and OR combination operators can be used to link criteria together. For example, using the AND combination operator, a rule can be defined to assign a priority for SNMP data received from a specific host. Also, the order in which the rules are specified may be significant. It is possible for a connection to match the criteria of multiple rules. Therefore, the PK 284 can apply rules in the order specified by the operator, taking the action of the first rule that matches. A default rule may also be set which defines the action to be taken for IP packets which do not match any of the defined rules. The set of rules selected by the operator may be defined in a prioritization profile.

As regards the path selection functionality, the PSK 286 is responsible for determining which path an IP packet should take to reach its destination. The path selected by the PSK 286 can be determined by applying path selection rules. The PSK 286 also determines which IP packets should be forwarded using an alternate path and which IP packets should be dropped when one or more primary paths fail. Path selection parameters can also be configured using profiles. The path selection rules may be designed to provide flexibility with respect to assigning paths while making sure that all of the packets related to the same traffic flow (e.g., the same TCP connection) take the same path (although it is also possible to send segments of the same TCP connection via different paths, this segment "splitting" may have negative side effects). Exemplary criteria that can be used to select a path include the following: priority of the IP packet as set by the PK 284 (should be the most common criterion): Destination IP address; Source IP address; IP next protocol; TCP port numbers (which may apply to both the TCP destination and source port numbers); UDP port numbers (which may apply to both the UDP destination and source port numbers); and IP differentiated services (DS) field. Similar to selective TCP spoofing and prioritization, the PSK 284 may determine a path by using any field in the IP packet.

As with the prioritization criteria (rules) the AND and OR combination operators can be used to link criteria together. For example, using the AND combination operator, a rule can be defined to select a path for SNMP data received from a specific host. Also, the order in which the rules are specified may be significant. It is possible for a connection to match the criteria of multiple rules. Therefore, the PSK 286 can apply rules in the order specified by the operator, taking the action of the first rule that matches. A default rule may also be set which defines the action to be taken for IP packets which do not match any of the defined rules. The set of rules selected by the operator may be defined in a path selection profile.

By way of example, a path selection rule may select the path based on any of the following path information in which IP packets match the rule: a primary path, a secondary path, and a tertiary path. The primary path may be specified in any path selection rule. The secondary path is used only when the primary path has failed. If no secondary path is specified, any IP packets that match the rule can be discarded when the primary path fails. The tertiary path is specified only if a secondary path is specified. The tertiary path is selected if both the primary and secondary paths have failed. If no tertiary path is specified, any IP packets that match the rule can be discarded when both the primary and secondary paths fail. Path selection may be generalized such that the path selection rule can select up to N paths where the Nth path is used only if the (N−1)th path fails. The example above where N=3 is merely illustrative, although N is typically a fairly small number.

By way of example, the operation of the system 100 is described as follows. First, a backbone connection is established between the PEPs 200 of two network gateways 120, 140 (i.e., the two spoofers), located at each end of the backbone link 130 for which TCP spoofing is desired. Whenever an IP host 110 initiates a TCP connection, the TSK 280 of the PEP 200 local to the IP host 110 checks its configured selective TCP spoofing rules. If the rules indicate that the connection should not be spoofed, the PEP 200 allows the TCP connection to flow end-to-end unspoofed. If the rules indicate that the connection should be spoofed, the spoofing PEP 200 locally responds to the IP host's TCP three-way handshake. In parallel, the spoofing PEP 200 sends a message across the backbone link 130 to its partner network gateway 140 asking it to initiate a TCP three-way handshake with the IP host 150 on its side of the backbone link 130. Data is then exchanged between the IP host 110,150 with the PEP 200 of the network gateway 120 locally acknowledging the received data and forwarding it across the backbone link 130 via the high speed backbone connection, compressing the data as appropriate based on the configured compression rules. The priority of the TCP connection is determined when the connection is established. The BPK 282 can multiplex the connection with other received connections over a single backbone connection, the PK 284 determines the priority of the connection and the PSK 286 determines the path the connection is to take.

The PEP 200, as described above, advantageously improves network performance by allocating TCP spoofing-related resources, such as buffer space, control blocks, etc., only to TCP connections for which spoofing is beneficial; by spoofing the three-way handshake to decrease data response time; by reducing the number of ACKs which are transmitted by performing local acknowledgement and by acknowledging multiple TCP connections with a single ACK; by performing data compression to increase the amount of data that can be transmitted; by assigning priorities to different connections; and by defining multiple paths for connections to be made.

Figure 3:
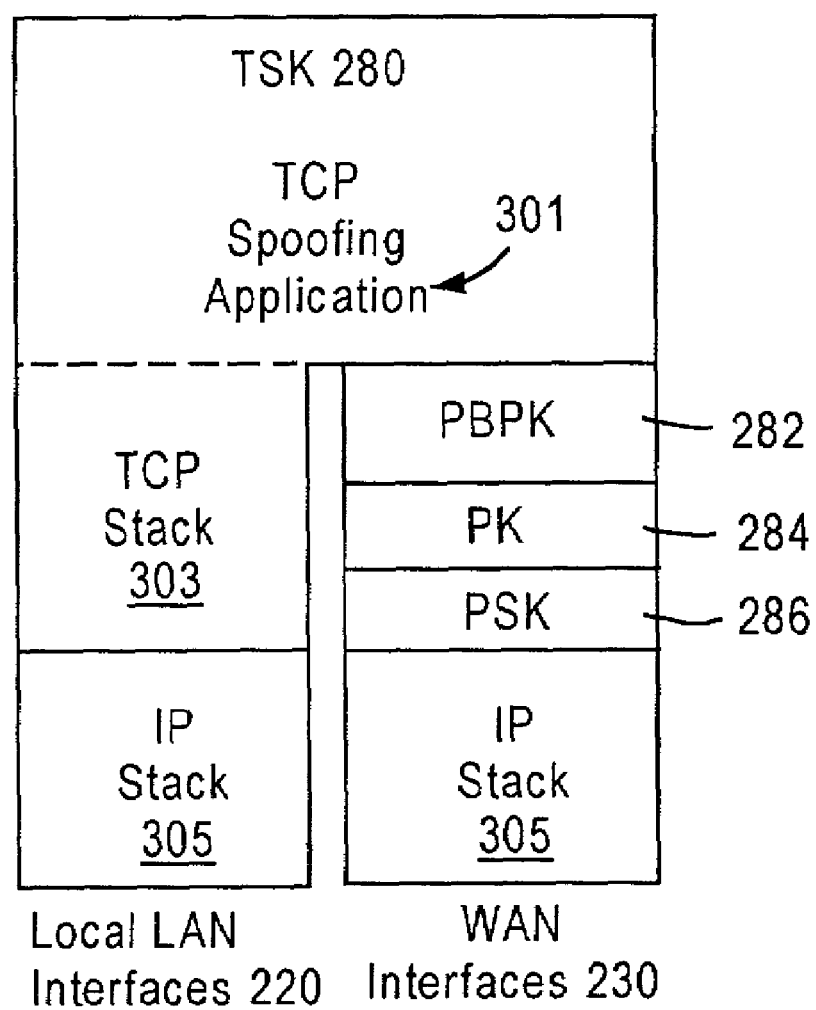
FIG. 3 is a diagram of a TCP Spoofing Kernel (TSK) utilized in the environment of FIG. 2.

FIG. 3 shows an exemplary stack, which illustrates the relationship between the TCP stack and the PEP kernels 280, 282, 284, 286 of the present invention. The TSK 280 is primarily responsible for functions related to TCP spoofing. The TSK 280, in an exemplary embodiment, includes two basic elements: a transport layer that encompasses a TCP stack 303 and an IP stack 305; and a TCP spoofing application 301. The transport layer is responsible for interacting with the TCP stacks (e.g., 303) of IP hosts 110 connected to a local LAN interface 220 of a PEP 210.

The TSK 280 implements the TCP protocol, which includes the appropriate TCP state machines and terminates spoofed TCP connections. The TCP spoofing application 301 rests on top of the transport layer and act as the application that receives data from and sends data to the IP hosts 110 applications. Because of the layered architecture of the protocol, the TCP spoofing application 301 isolates the details of TCP spoofing from the transport layer, thereby allowing the transport layer to operate in a standard fashion.

As shown in FIG. 3, the TCP spoofing application 301 can also interface to the BPK 282 associated with the WAN interfaces 230. The BPK 282 performs backbone protocol maintenance, implementing the protocol by which the network gateways 120, 140 (in FIG. 1) communicate. The BPK 282 provides reliable delivery of data, uses a relatively small amount of acknowledgement traffic, and supports generic backbone use (i.e., use not specific to the TSK 280); one such example is the reliable data protocol (RDP).

The BPK 282 lies above the PK 284 and the PSK 286, according to an exemplary embodiment. The PK 284 is responsible for determining the priority of IP packets and then allocating transmission opportunities based on priority. The PK 284 can also control access to buffer space by controlling the queue sizes associated with sending and receiving IP packets. The PSK 286 determines which path an IP packet should take to reach its destination. The path selected by the PSK 286 can be determined applying path selection rules. PSK 286 may also determine which IP packet should be forwarded using an alternate path and which packets should be dropped when one or more primary paths fail.

Figure 4A:
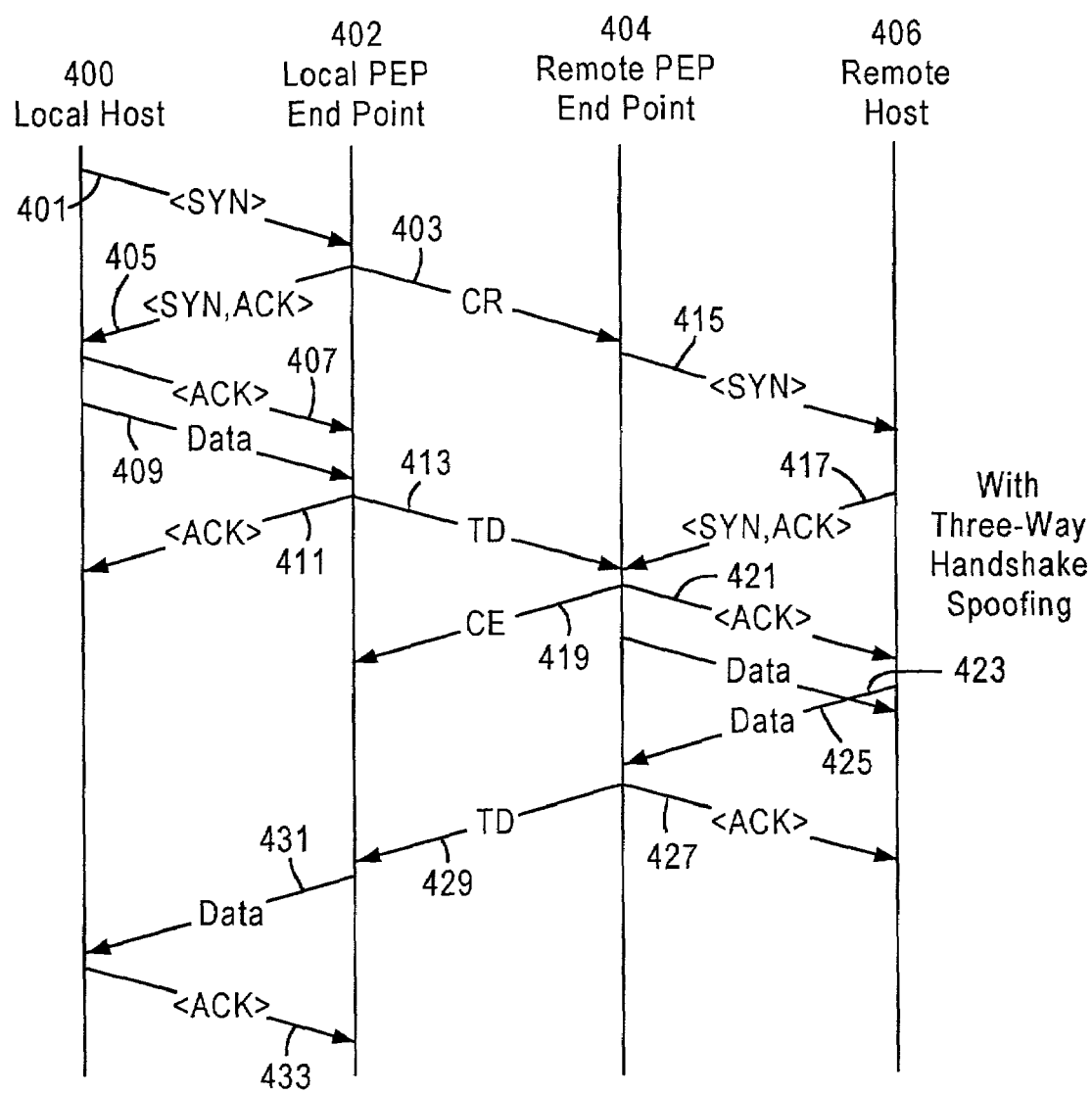
FIGS. 4A and 4B are flow diagrams of the connection establishment with three-way handshake spoofing and without three-way handshake spoofing, respectively.
Figure 4B:
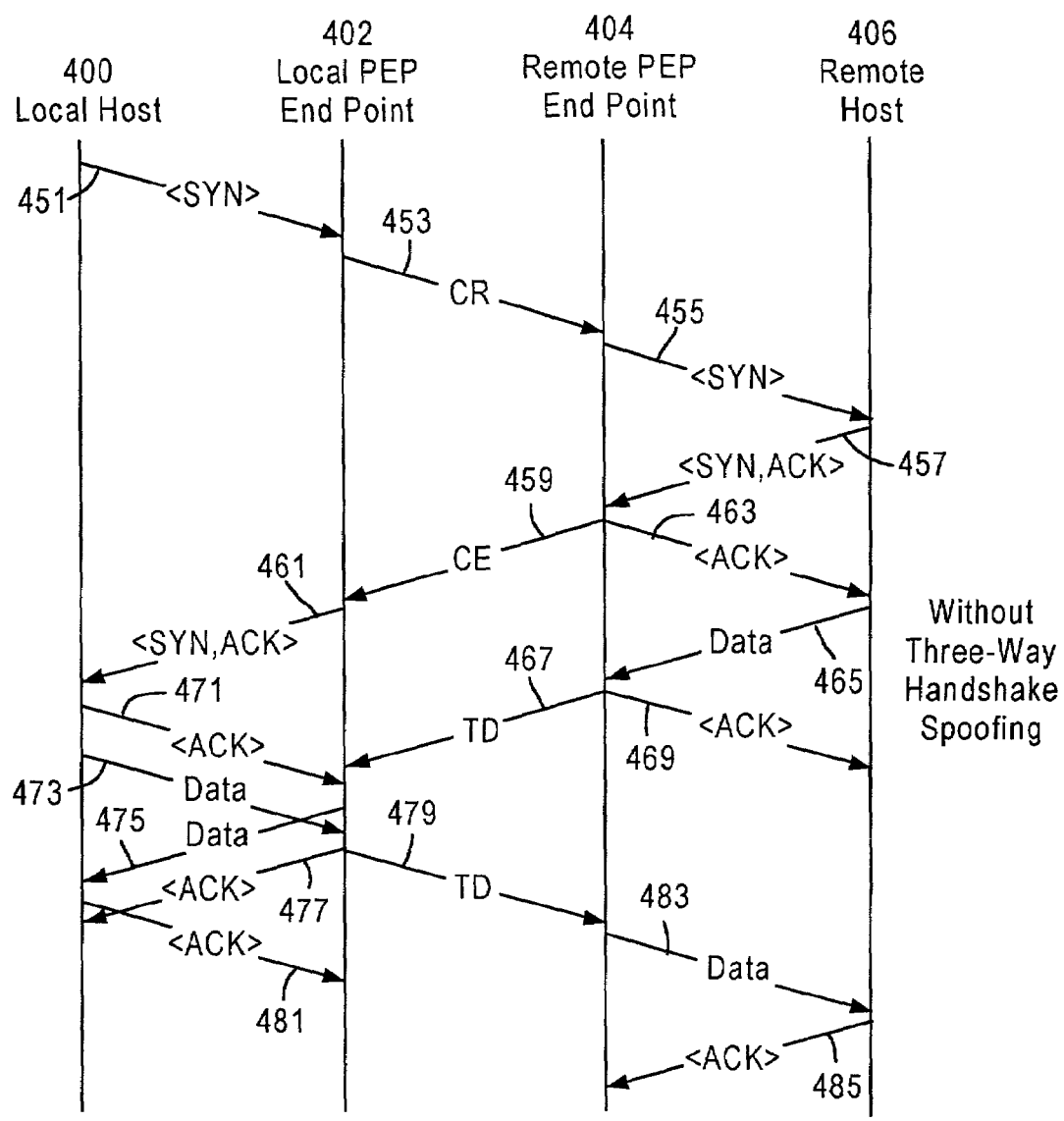

FIGS. 4A and 4B show flow diagrams of the establishment of a spoofed TCP connection utilizing three-way handshake spoofing and without three-way handshake spoofing, respectively. The TCP Spoofing Kernel 280 establishes a spoofed TCP connection when a TCP <SYN> segment is received from its local LAN or a Connection Request message from its TSK peer. It is noted that the three-way handshake spoofing may be disabled to support an end to end maximum segment size (MSS) exchange, which is more fully described below. For the purpose of explanation, the spoofed TCP connection establishment process is described with respect to a local host 400, a local PEP end point 402, a remote PEP end point 404, and a remote host 406. As mentioned previously, the TSK 280 within each of the PEP end points 402 and 404 provides the spoofing functionality.

In step 401, the local host 400 transmits a TCP <SYN> segment to the local PEP end point 402 at a local LAN interface 220. When a TCP segment is received from the local LAN interface 220, the platform environment 402 determines whether there is already a TCP connection control block (CCB) assigned to the TCP connection associated with the TCP segment. If there is no CCB, the environment 402 checks whether the TCP segment is a <SYN> segment that is being sent to a non-local destination. If so, the <SYN> segment represents an attempt to bring up a new (non-local) TCP connection, and the environment 402 passes the segment to the TCP Spoofing Kernel 280 to determine the TCP connection's disposition. When a TCP <SYN> segment is received from the local LAN interface 220 for a new TCP connection, the TCP Spoofing Kernel 280 first determines if the connection should be spoofed. If the connection should be spoofed, TSK 280 uses (in an exemplary embodiment) the priority indicated in the selected TCP spoofing parameter profile and the peer index (provided by the environment 210 with the TCP <SYN> segment) to construct the handle of the backbone connection which should be used to carry this spoofed TCP connection. In the exemplary embodiment, the peer index is used as the 14 high order bits of the handle and the priority is used as the two low order bits of the handle. The backbone connection handle is then used (via the TSK control block (TCB) mapping table) to find the TCB associated with the backbone connection. TSK 280 of PEP end point 402 then checks whether the backbone connection is up. If the backbone connection is up, TSK 280 determines whether the number of spoofed TCP connections that are already using the selected backbone connection is still currently below the CCB resource limit. The CCB resource limit is the smaller of the local number of CCBs (provided as a parameter by the platform environment 210) and the peer number of CCBs (received in the latest TSK peer parameters (TPP) message from the TSK peer) available for this backbone connection. If the number of connections is still below the limit, TSK 280 of PEP end point 402 assigns a unique TCP connection identifier (e.g., a free CCB mapping table entry index) to the connection and calls the environment 210 to allocate a TCP connection control block for the connection.

TSK 280 of PEP end point 402 returns the TCP <SYN> segment back to the environment 210 to be forwarded unspoofed if any of the above checks fail. In other words, the following conditions result in the TCP connection being unspoofed. First, if the selective TCP spoofing rules indicate that the connection should not be spoofed. Also, there is no backbone connection for the priority at which the TCP connection should be spoofed (indicated by the absence of a TCB for the backbone connection). No spoofing is performed if the backbone connection is down. Additional, if the number of spoofed TCP connections that are already using the backbone connection reaches or exceeds a predetermined threshold, then no spoofing is performed. Further, if there is no CCB mapping table entry available or there is no CCB available from the CCB free pool, then the TCP connection is forwarded unspoofed. For the case in which there is no backbone connection, TSK 280 of PEP end point 402 may also post an event to alert the operator that there is a mismatch between the configured TCP spoofing parameter profiles and the configured set of backbone connections.

Continuing with the example, if all of the above checks pass, TSK 280 of PEP end point 402 writes the backbone connection handle into the buffer holding the TCP <SYN> segment. It is noted that this is not done until a CCB is successfully allocated by the platform environment 402, because the environment does not count the buffer unless a CCB is successfully allocated. TSK 280 then copies the parameters from the selected TCP spoofing parameter profile into the CCB. Consequently, relevant information (e.g., the maximum segment size that is advertised by the host (if smaller than the configured MSS), the initial sequence number, and etc.) is copied out of the TCP <SYN> segment and stored in the CCB. It is noted that the source and destination IP addresses and source and destination TCP port numbers will already have been placed into the CCB by the platform environment 402 when the CCB was allocated; the environment 402 uses this information to manage CCB hash function collisions.

After allocating and setting up the CCB, the TCP Spoofing Kernel 280 of PEP end point 402 constructs a Connection Request (CR) message, per step 403, and sends it to its TSK peer associated with the remote PEP end point 404. The CR message basically contains all of the information extracted from the TCP spoofing parameter profile and the TCP <SYN> segment and stored in the local CCB, e.g., the source and destination IP addresses, the source and destination TCP port numbers, the MSS value, etc., with the exception of fields that have only local significance, such as the initial sequence number. (The IP addresses and TCP port numbers are placed into a TCP connection header.) In other words, the CR message contains all of the information that the peer TSK of PEP end point 404 requires to set up its own CCB. To complete the local connection establishment, the TCP Spoofing Kernel 280 of the local PEP end point 402 sends a TCP <SYN,ACK> segment to the local host 400 in response to the <SYN> segment received, per step 405. TSK 280 of PEP end point 402 performs step 405 simultaneously with the step of sending the Connection Request message (i.e., step 403), if three-way handshake spoofing is enabled. Otherwise, TSK 280 of 402 waits for a Connection Established (CE) message from its TSK peer of the remote PEP end point 404 before sending the <SYN,ACK> segment. In an exemplary embodiment, TSK 280 of PEP end point 402 selects a random initial sequence number (as provided in IETF (Internet Engineering Task Force) RFC 793, which is incorporated herein by reference in its entirety) to use for sending data.

If three-way handshake spoofing is disabled, the MSS value sent in the <SYN,ACK> segment is set equal to the MSS value received in the CE message. If three-way handshake spoofing is enabled, the MSS value is determined from the TCP spoofing parameter profile selected for the connection (and the configured path maximum transmission unit (MTU)). For this case, TSK 280 of PEP end point 402 then compares the MSS value received in the Connection Established message, when it arrives, to the value it sent to the local host in the TCP <SYN,ACK> segment. If the MSS value received in the CE message is smaller than the MSS value sent to the local host, a maximum segment size mismatch exists. (If an MSS mismatch exists, TSK may need to adjust the size of TCP data segments before sending them.) After sending the TCP <SYN,ACK> segment (step 405), TSK 280 of the local PEP end point 402 is ready to start accepting data from the local host 400. In step 407, the local host 400 transmits an <ACK> segment to the TSK 280 of PEP end point 402; thereafter, the local host forwards, as in step 409 data to the TSK 280 of PEP end point 402 as well. When three-way handshake spoofing is being used, TSK 280 does not need to wait for the Connection Established message to arrive from its TSK peer before accepting and forwarding data. As seen in FIG. 4A, in step 411, TSK 280 of the local PEP end point 402 sends an <ACK> segment to the local host and simultaneously sends the TCP data (TD) from the local host 400 to the peer TSK of PEP end point 404 (per step 413) prior to receiving a CE message from the peer TSK of PEP end point 404.

However, TSK 280 of PEP end point 402 does not accept data from its TSK peer of PEP end point 404 until after the CE message has been received. TSK 280 of PEP end point 402 does not forward any data received from its TSK peer of PEP end point 404 to the local host 400 until it has received the TCP <ACK> segment indicating that the local host has received the <SYN,ACK> segment (as in step 407).

When a Connection Request message is received from a peer TSK (step 403), the TCP Spoofing Kernel 280 allocates a CCB for the connection and then stores all of the relevant information from the CR message in the CCB. TSK 280 of PEP end point 404 then uses this information to generate a TCP <SYN> segment, as in step 415, to send to the remote host 406. The MSS in the <SYN> segment is set to the value received from the TSK peer of PEP end point 404. When the remote host responds with a TCP <SYN,ACK> segment (step 417), TSK 280 of PEP end point 404 sends a Connection Established message to its TSK peer of the PEP end point 402 (step 419), including in the CE message the MSS that is sent by the local host in the <SYN,ACK> segment. TSK 280 of PEP end point 404 also responds, as in step 421, with a TCP <ACK> segment to complete the local three-way handshake. The peer TSK of PEP end point 404 then forwards the data that is received from TSK 280 to the host, per step 423. Concurrently, in step 425, the remote host 406 sends data to the peer TSK of PEP end point 404, which acknowledges receipt of the data by issuing an <ACK> segment to the host 406, per step 427. Simultaneously with the acknowledgement, the data is sent to TSK 280 of PEP end point 402 (step 429).

At this point, TSK 280 is ready to receive and forward data from either direction. TSK 280 forwards the data, as in step 431 to the local host, which, in turn, sends an <ACK> segment (step 433). If the data arrives from its TSK peer before a <SYN,ACK> segment response is received from the local host, the data is queued and then sent after the <ACK> segment is sent in response to the <SYN,ACK> segment (when it arrives).

Turning now to FIG. 4B, a spoofed TCP connection is established with the three-way handshake spoofing disabled. Under this scenario, the local host 400 transmits a TCP <SYN> segment, as in step 451, to the TSK 280 within the local PEP end point 402. Unlike the TCP connection establishment of FIG. 4A, the local PEP end point 402 does not respond to the a TCP <SYN> segment with a <SYN,ACK> segment, but merely forwards a CR message to the remote PEP end point 404 (step 453). Next, in step 455, sends a TCP <SYN> segment to the remote host 406. In response, the remote host 406 transmit a TCP <SYN,ACK> segment back to the remote PEP end point 404 (per step 457). Thereafter, the remote PEP end point 404, as in step 459, forwards a CE message to the local PEP end point 402, which subsequently issues a <SYN,ACK> segment to the local host 400, per step 461. Simultaneous with step 459, the remote PEP end point 404 issues an <ACK> segment to the remote host 406 (step 463).

Upon receiving the <ACK> segment, the remote host 406 may begin transmission of data, as in step 465. Once the PEP end point 404 receives the data from the remote host 406, the remote PEP end point 404 simultaneously transmits, as in step 467, the TD message to the local PEP end point 402 and transmits an <ACK> segment to the remote host 406 to acknowledge receipt of the data (step 469).

Because the local host 400 has received a <SYN,ACK> segment from the local PEP end point 402, the local host 400 acknowledges the message, per step 471. Thereafter, the local host 400 transmits data to the local PEP end point 402. In this example, before the local PEP end point 402 receives the data from the local host 400, the local PEP end point 402 forwards the data that originated from the remote host 406 via the TD message (step 467) to the local host 400, per step 475.

In response to the data received (in step 473), the local PEP end point 402 issues an <ACK> segment, as in step 477, and forwards the data in a TD message to the remote PEP end point 404, per step 479. The local host 400 responds to the received data of step 475 with an <ACK> segment to the local PEP end point 402 (step 481). The remote PEP end point 404 sends the data from the local host 400, as in step 483, upon receipt of the TD message. After receiving the data, the remote host 406 acknowledges receipt by sending an <ACK> segment back to the remote PEP end point 404, per step 485.

Figure 5:
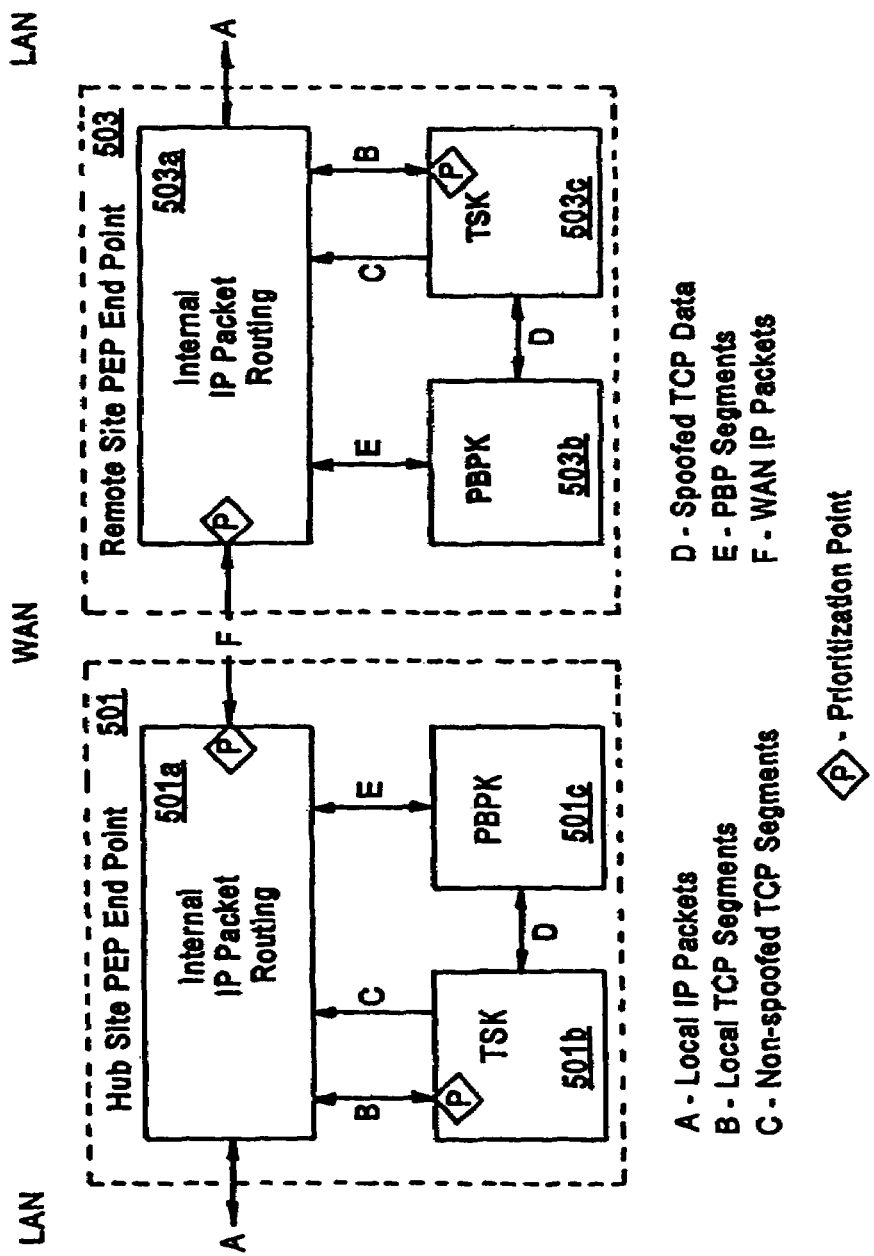
FIG. 5 is a diagram of a PEP packet flow between two PEP end points, according to an embodiment of the present invention.

FIG. 5 shows the flow of packets with the PEP architecture, according to one embodiment of the present invention. As shown, a communication system 500 includes a hub site (or local) PEP end point 501 that has connectivity to a remote site PEP end point 503 via a backbone connection. By way of example, at the hub site (or local site) and at each remote site, PEP end points 501 and 503 handle IP packets. PEP end point 501 includes an internal IP packet routing module 501a that receives local IP packets and exchanges these packets with a TSK 501b and a BPK 501c. Similarly, the remote PEP end point 503 includes an internal IP packet routing module 503a that is in communication with a TSK 503b and a BPK 503c. Except for the fact that the hub site PEP end point 501 may support many more backbone protocol connections than a remote site PEP end point 503, hub and remote site PEP processing is symmetrical.

For local-to-WAN traffic (i.e., upstream direction), the PEP end point 501 receives IP packets from its local interface 220 (FIG. 2). Non-TCP IP packets are forwarded (as appropriate) to the WAN interface 230 (FIG. 2). TCP IP packets are internally forwarded to TSK 501b. TCP segments which belong to connections that are not be spoofed are passed back by the spoofing kernel 501b to the routing module 501a to be forwarded unmodified to the WAN interface 230. For spoofed TCP connections, the TCP spoofing kernel 501a locally terminates the TCP connection. TCP data that is received from a spoofed connection is passed from the spoofing kernel 501a to the backbone protocol kernel 501c, and then multiplexed onto the appropriate backbone protocol connection. The backbone protocol kernel 501c ensures that the data is delivered across the WAN.

For WAN-to-local traffic (i.e., downstream direction), the remote PEP end point 503 receives IP packets from its WAN interface 230 (FIG. 2). IP packets that are not addressed to the end point 503 are simply forwarded (as appropriate) to the local interface 220 (FIG. 2). IP packets addressed to the end point 503, which have a next protocol header type of "PEP Backbone Protocol (PBP)" are forwarded to the backbone protocol kernel 503c. The backbone protocol kernel 503c extracts the TCP data and forwards it to the TCP spoofing kernel 503b for transmission on the appropriate spoofed TCP connection. In addition to carrying TCP data, the backbone protocol connection is used by the TCP spoofing kernel 501b to send control information to its peer TCP spoofing kernel 503b in the remote PEP end point 503 to coordinate connection establishment and connection termination.

Prioritization may be applied at four points in the system 500 within routing 501a and TSK 501b of PEP end point 501, and within routing 503a, and TSK 503b of PEP end point 503. In the upstream direction, priority rules are applied to the packets of individual TCP connections at the entry point to the TCP spoofing kernel 501b. These rules allow a customer to control which spoofed applications have higher and lower priority access to spoofing resources. Upstream prioritization is also applied before forwarding packets to the WAN. This allows a customer to control the relative priority of spoofed TCP connections with respect to unspoofed TCP connections and non-TCP traffic (as well as to control the relative priority of these other types of traffic with respect to each other). On the downstream side, prioritization is used to control access to buffer space and other resources in the PEP end point 503, generally and with respect to TCP spoofing.

At the hub (or local) site, the PEP end point 501 may be implemented in a network gateway (e.g. an IP Gateway), according to one embodiment of the present invention. At the remote site, the PEP end point 503 may be implemented in the remote site component, e.g. a satellite terminal such as a Multimedia Relay, a Multimedia VSAT or a Personal Earth Station (PES) Remote.

The architecture of system 500 provides a number of advantages. First, TCP spoofing may be accomplished in both upstream and downstream directions. Additionally, the system supports spoofing of TCP connection startup, and selective TCP spoofing with only connections that can benefit from spoofing actually spoofed. Further, system 500 enables prioritization among spoofed TCP connections for access to TCP spoofing resources (e.g., available bandwidth and buffer space). This prioritization is utilized for all types of traffic that compete for system resources.

With respect to the backbone connection, the system 500 is suitable for application to a satellite network as the WAN. That is, the backbone protocol is optimized for satellite use in that control block resource requirements are minimized, and efficient error recovery for dropped packets are provided. The system 500 also provides a feedback mechanism to support maximum buffer space resource efficiency. Further, system 500 provides reduced acknowledgement traffic by using a single backbone protocol ACK to acknowledge the data of multiple TCP connections.

Figure 6:
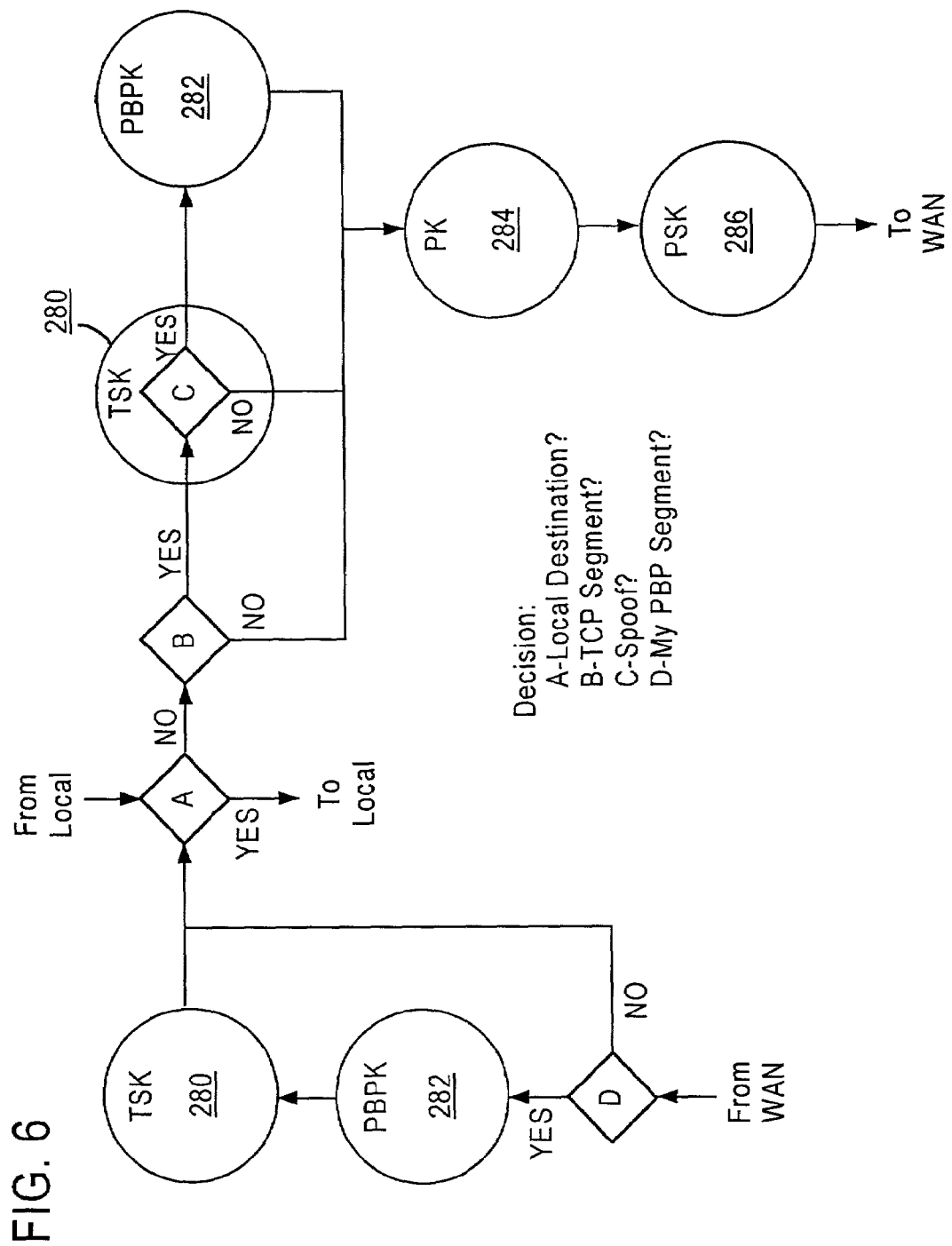
FIG. 6 is a diagram of an IP (Internet Protocol) packet flow through a PEP end point, in accordance with an embodiment of the present invention.

FIG. 6 illustrates the flow of IP packets through a PEP end point, according to an embodiment of the present invention. When IP packets are received at the local LAN interface 220, the PEP end point 210 determines (as shown by decision point A), whether the packets are destined for a host that is locally situated; if so, the IP packets are forwarded to the proper local LAN interface 220. If the IP packets are destined for a remote host, then the PEP end point 210 decides, per decision point B, whether the traffic is a TCP segment. If the PEP end point 210 determines that in fact the packets are TCP segments, then the TSK 280 determines whether the TCP connection should be spoofed. (decision point C.) However, if the PEP end point 210 determines that the packets are not TCP segments, then the BPK 282 processes the traffic, along with the PK 284 and the PSK 286 for eventual transmission out to the WAN. It should be noted that the BPK 282 does not process unspoofed IP packets; i.e., the packets flow directly to PK 284. As seen in FIG. 6, traffic that is received from the WAN interface 230 is examined to determine whether the traffic is a proper PBP segment (decision point D) for the particular PEP end point 210; if the determination is in the affirmative, then the packets are sent to the BPK 282 and then the TSK 280.

Routing support includes routing between the ports of the PEP End Point 210 (FIG. 2), e.g., from one Multimedia VSAT LAN port to another. Architecturally, the functionalities of TCP spoofing, prioritization and path selection, fit between the IP routing functionality and the WAN. PEP functionality need not be applied to IP packets which are routed from local port to local port within the same PEP End Point 210. TCP spoofing, prioritization and path selection are applied to IP packets received from a local PEP End Point interface that have been determined to be destined for another site by the routing function.

Figure 7:
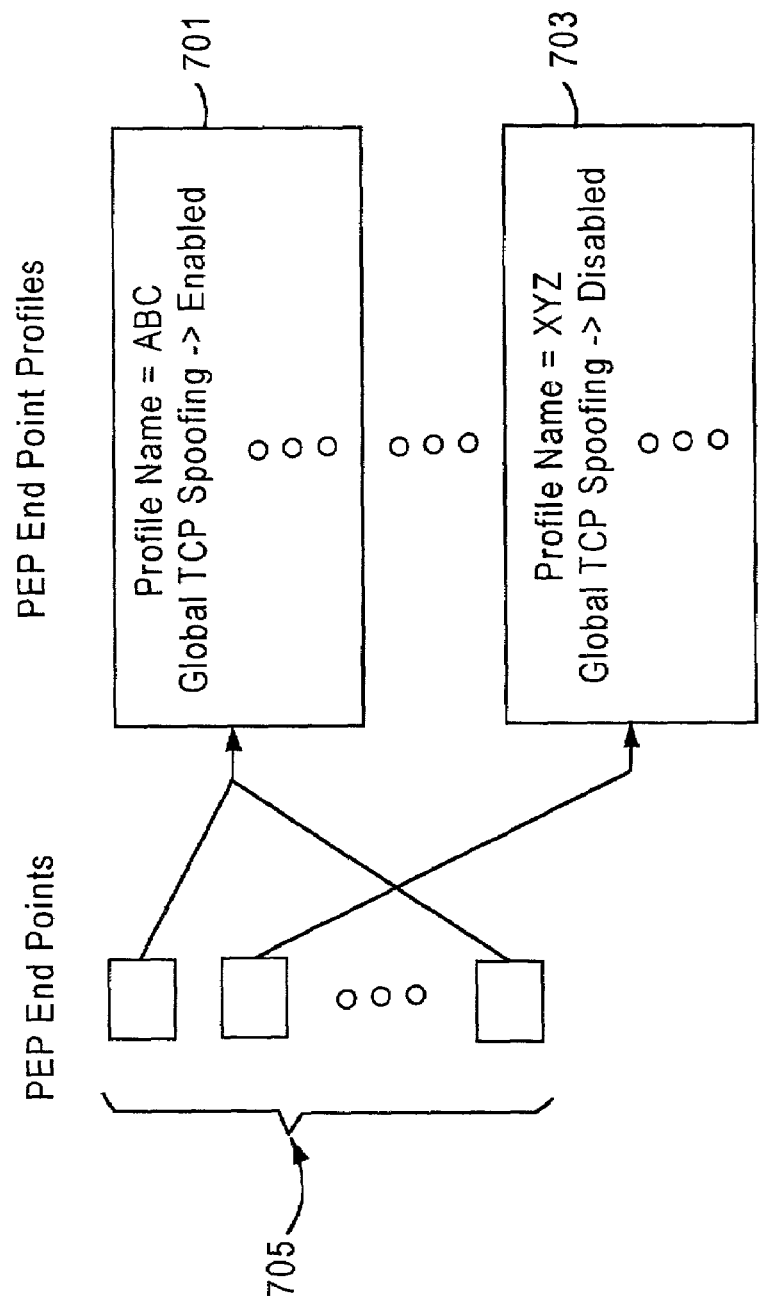
FIG. 7 is a diagram of PEP end point profiles utilized in the platform of FIG. 2.

FIG. 7 shows the relationship between PEP End Points and PEP End Point profiles, in accordance with an embodiment of the present invention. PEP parameters are primarily configured via a set of profiles 701 and 703, which are associated with one or more PEP end points 705. In an exemplary embodiment, PEP parameters are configured on a per PEP End Point basis, such as whether TCP spoofing is globally enabled. These parameters are configured in the PEP End Point profiles 701 and 703. It is noted that parameters that apply to specific PEP kernels may be configured via other types of profiles. Profiles 701 and 703 are a network management construct; internally, a PEP End Point 705 processes a set of parameters that are received via one or more files.

Whenever the PEP End Point 705 receives new parameters, the platform environment compares the new parameters to the existing parameters, figures out which of the PEP kernels are affected by the parameter changes, and then passes the new parameters to the affected kernels. In an exemplary embodiment, all parameters are installed dynamically. With the exception of parameters that are component specific (such as the IP addresses of a component), all parameters may be defined with default values.

As mentioned previously, the PEP end point 210 may be implemented in a number of different platforms, in accordance with the various embodiments of the present invention. These platforms may include an IP gateway, a Multimedia Relay, a Multimedia VSAT (Very Small Aperture Terminal), and a Personal Earth Station (PES) Remote, as shown in FIGS. 8-11, respectively. In general, as discussed in FIG. 2, the PEP end point 210 defines a local LAN interface 220 an interface through which the PEP End Point 210 connects to IP hosts located at the site. A WAN interface 230 is an interface through which the PEP End Point 210 connects to other sites. It is noted that a WAN interface 230 can physically be a LAN port. FIGS. 8-11, below, describe the specific LAN and WAN interfaces of the various specific PEP End Point platforms. The particular LAN and WAN interfaces that are employed depend on which remote site PEP End Points are being used, on the configuration of the hub and remote site PEP End Points and on any path selection rules which may be configured.

Figure 8:
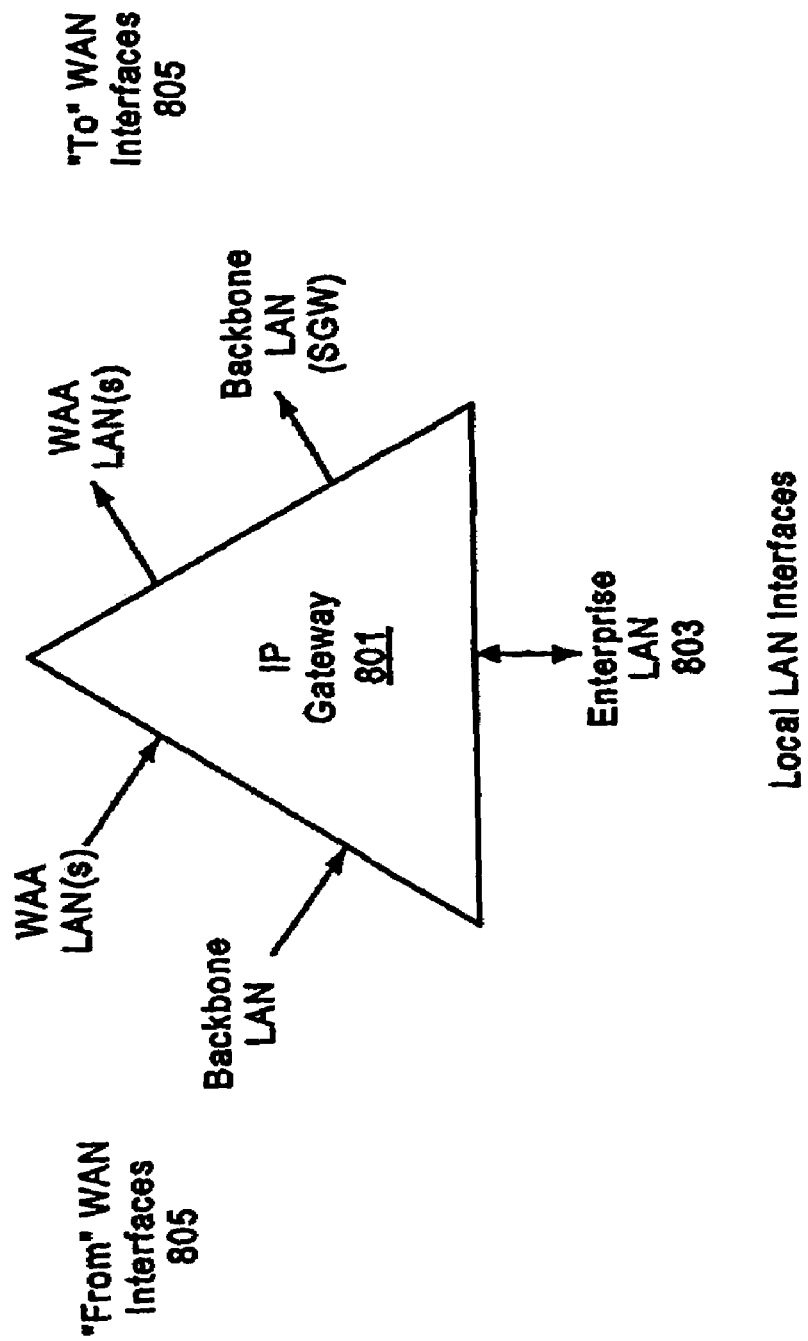
FIG. 8 is a diagram of the interfaces of a PEP end point implemented as an IP gateway, according to an embodiment of the present invention.

FIG. 8 shows the interfaces of the PEP end point implemented as an IP gateway, according to one embodiment of the present invention. By way of example, an IP Gateway 801 has a single local LAN interface, which is an enterprise interface 801. The IP Gateway 803 employs two WAN interfaces 805 for sending and receiving IP packets to and from remote site PEP End Points: a backbone LAN interface and a wide area access (WAA) LAN interface.

The backbone LAN interface 805 is used to send IP packets to remote site PEP End Points via, for example, a Satellite Gateway (SGW) and a VSAT outroute. A VSAT outroute can be received directly by Multimedia Relays (FIG. 9) and Multimedia VSATs (FIG. 10) (and is the primary path used with these End Points); however, IP packets can be sent to a PES Remote (FIG. 11) via a VSAT outroute.

Figure 9:
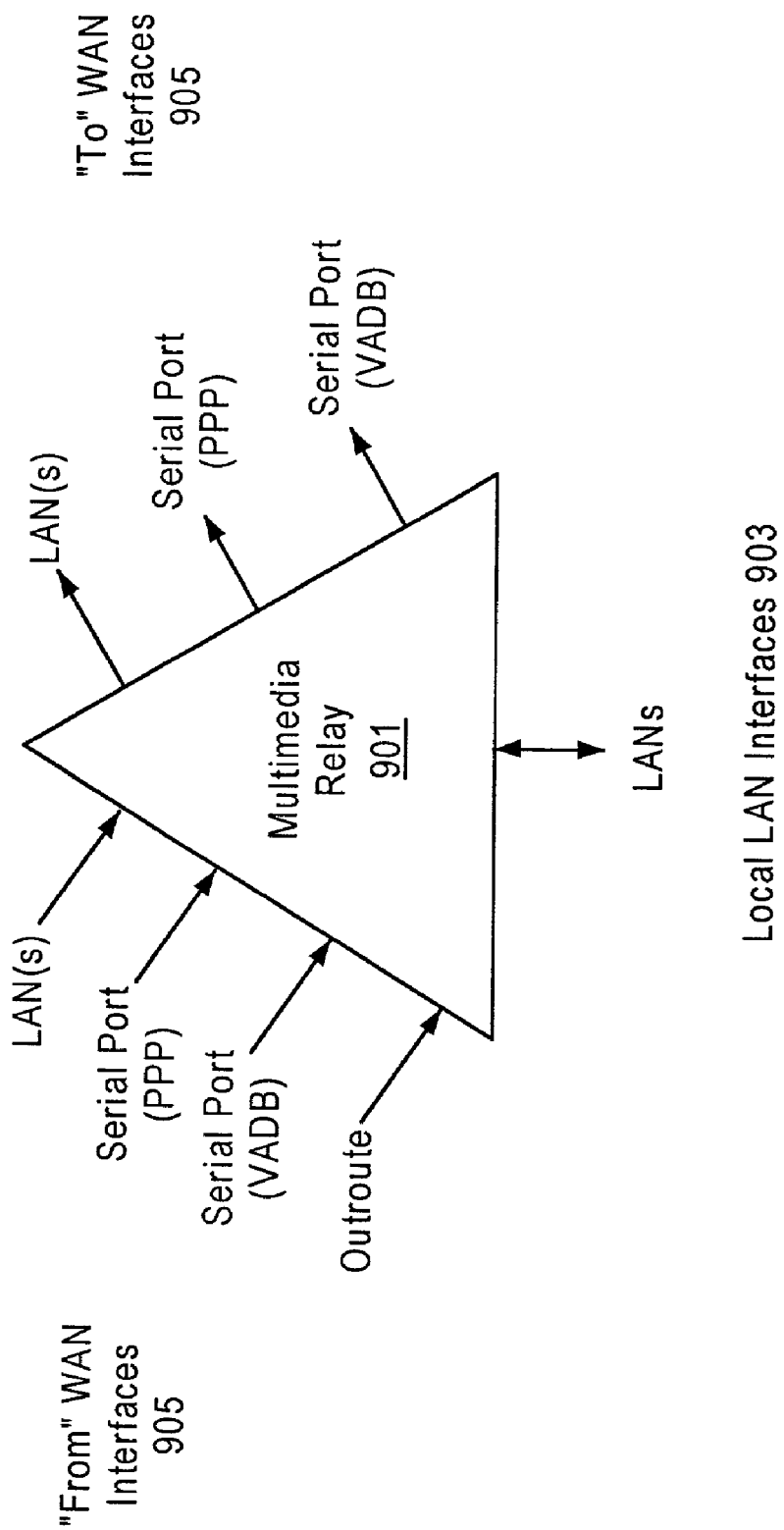
FIG. 9 is a diagram of the interfaces of a PEP end point implemented as a Multimedia Relay, according to an embodiment of the present invention.

FIG. 9 shows a Multimedia Relay implementation of a PEP end point, in accordance with an embodiment of the present invention. A Multimedia Relay has two or three local LAN interfaces 903. A Multimedia Relay 901 has up to two WAN interfaces 905 for sending IP packets to hub site PEP End Points: one of its LAN interfaces and a PPP serial port interface, and four or five interfaces for receiving IP packets from hub site PEP End Points, a VSAT outroute, all of its LAN interfaces, and a PPP serial port interface. It is noted that a PPP (Point-to-Point Protocol) serial port interface and a LAN interface are generally not be used at the same time.

A Multimedia Relay 901 supports the use of all of its LAN interfaces 903 at the same time for sending and receiving IP packets to and from hub site PEP End Points. Further, a Multimedia Relay 905 supports the use of a VADB (VPN Automatic Dial Backup) serial port interface for sending and receiving IP packets to and from the hub site PEP End Points.

Figure 10:
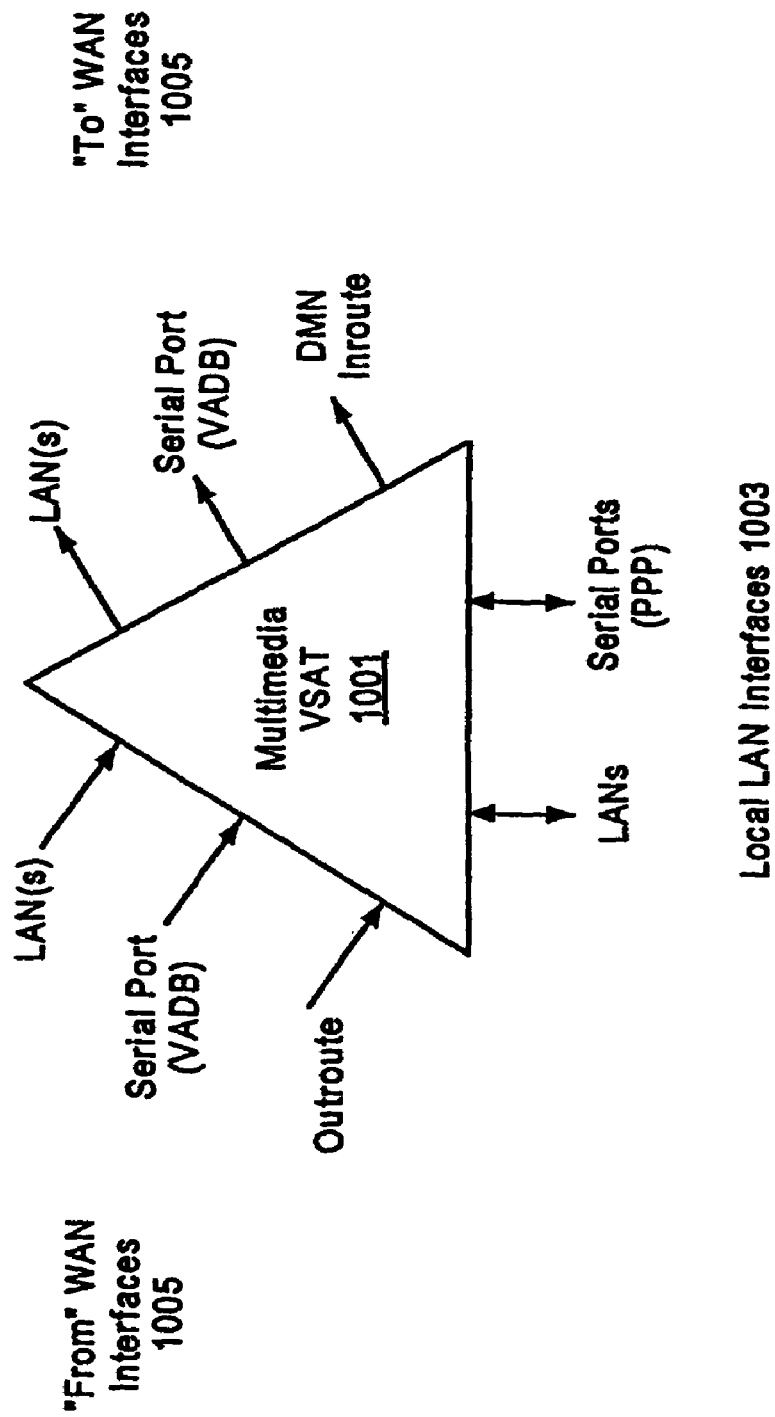
FIG. 10 is a diagram of the interfaces of a PEP end point implemented as a Multimedia VSAT (Very Small Aperture Terminal), according to an embodiment of the present invention.

FIG. 10 shows a Multimedia VSAT implementation of the PEP end point, according to one embodiment of the present invention. A Multimedia VSAT 1001, in an exemplary embodiment, has two local LAN interfaces 1003. Support for one or more local PPP serial port interfaces may be utilized. The Multimedia VSAT 1001 has two WAN interfaces 1005 for sending IP packets to hub site PEP End Points: a VSAT inroute and one of its LAN interfaces. The Multimedia VSAT 1001 thus has three interfaces for receiving IP packets from hub site PEP End Points, the VSAT outroute and both of its LAN interfaces 1003. A Multimedia VSAT 1001 may support uses of both of its LAN interfaces 1001 at the same time for sending and receiving IP packets to and from hub site PEP End Points. The Multimedia VSAT 1003 further supports the use of a VADB serial port interface for sending and receiving IP packets to and from the hub site PEP End Points.

Figure 11:
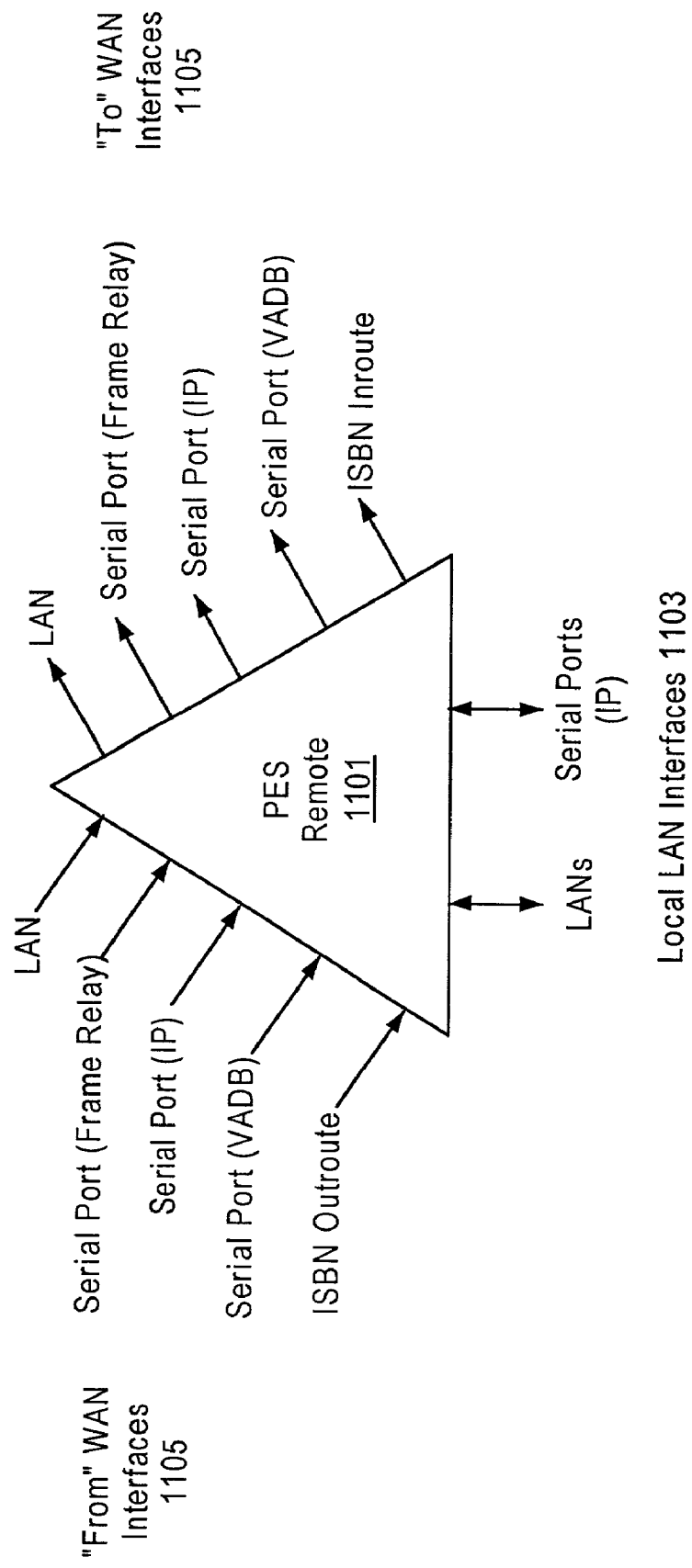
FIG. 11 is a diagram of the interfaces of a PEP end point implemented in an earth station, according to an embodiment of the present invention.

FIG. 11 shows a PES Remote implementation of a PEP end point, according to one embodiment of the present invention. A PES Remote 1101 may have a local LAN interface and/or several local IP (e.g. PPP, SLIP, etc.) serial port interfaces, collectively denoted as LAN interfaces 1103. The particular LAN interfaces 1103 depend on the specific PES Remote platform. PES Remote 1101, in an exemplary embodiment, has up to five WAN interfaces 1105 for sending IP packets to hub site PEP End Points, an ISBN inroute, a LAN interface, a VADB serial port interface, a Frame Relay serial port interface and an IP serial port interface, and up to five existing interfaces for receiving IP packets from hub site PEP End Points: an ISBN outroute, a LAN interface, a VADB serial port interface, a Frame Relay serial port interface, and an IP serial port interface. The physical Frame Relay serial port interface may be supporting multiple Permanent Virtual Circuits (PVCs); some of which are equivalent to local interfaces 1103 and some of which are WAN interfaces 1105.

Figure 12:
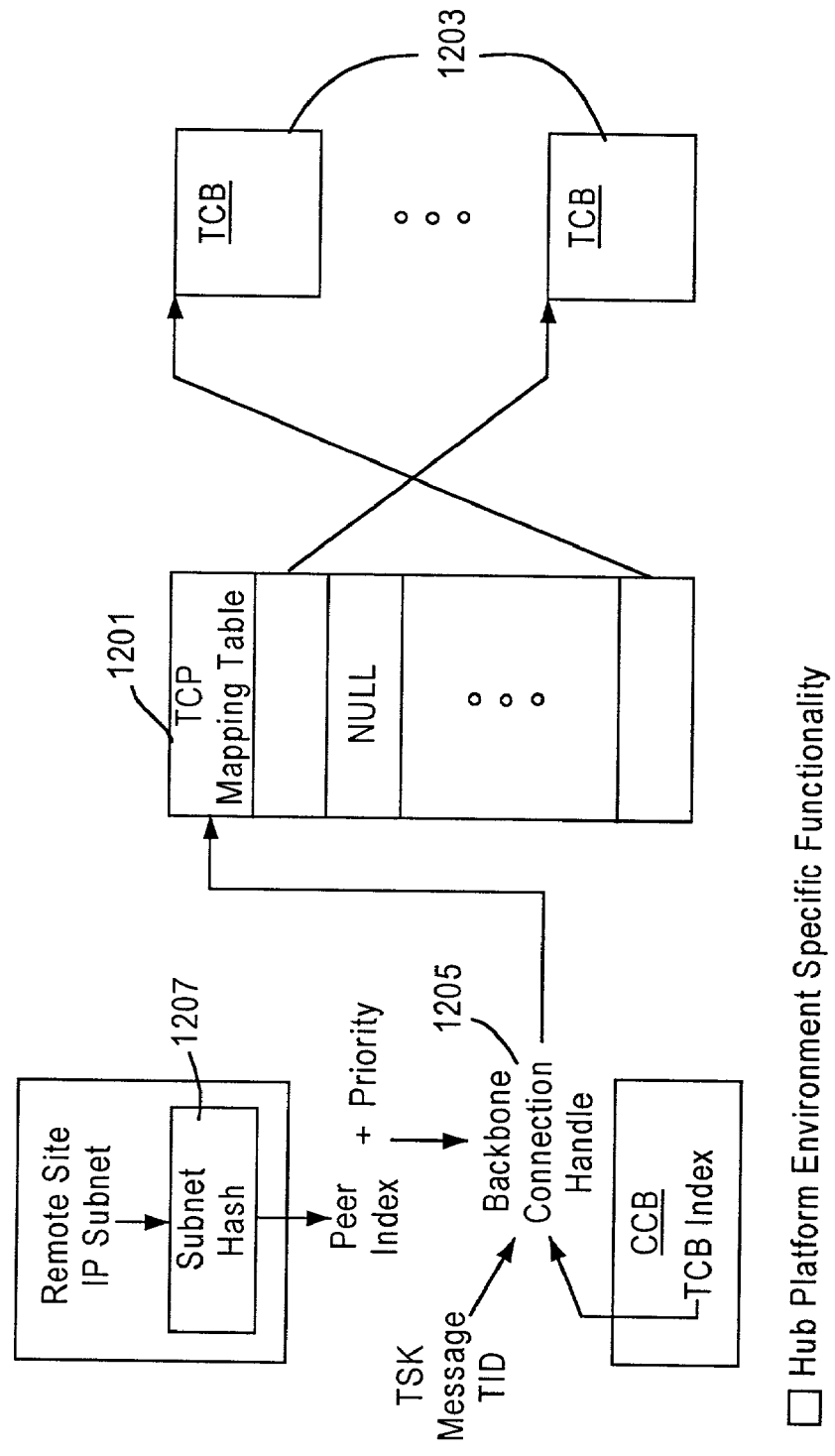
FIG. 12 is diagram of a TSK control block (TCB) access via a TCB mapping table, according to an embodiment of the present invention.

FIG. 12 shows a diagram of an exemplary network management system (NMS) for PEP end points, according to an embodiment of the present invention. As shown, a communication system 1200 includes a hub (or local) site PEP end point 1201 that contains a Simple Network Management Protocol (SNMP) agent 1203. As previously discussed, hub (or local) site PEP end point 1201 may communicate via a WAN 1205 to a remote PEP end point 1207, which similarly provides a SNMP agent 1209. In an exemplary embodiment, hub (or local) site PEP end point 1201 connects to a LAN 1211. A network management system 1213 receives data from SNMP agents 1203 and 1209. The NMS 1213 maintains a database 1215 that stores an event log to assist in debugging of either of the hub (or local) site PEP end point 1201 or the remote PEP end point. Also, the NMS 1213 includes an operator console 1217 to support logging in of events.

The TCP Spoofing Kernel 280 can support a number of backbone connections to TSK peers, as determined by the particular PEP End Point platform software build. In general, this number is equal to the number of backbone connections that the PEP End Point platform as a whole supports. In an exemplary embodiment, all of the internal software components support the same number of backbone connections. However, because the backbone connections may be used for things other than TCP spoofing, the TSK 280 may support less backbone connections than are supported by the PEP End Point 210 as a whole. At startup, the platform environment 210 calls TSK 280 to add backbone connections to the configuration of the TCP Spoofing Kernel 280. For each backbone connection, the platform environment 210 provides the handle 1205 that it will use for the connection, which may be derived from the PEP End Point peer's peer index and the priority of the connection.

As part of its configuration, a PEP End Point 210 receives a list of PEP End Point peers to which it should establish PEP backbone (PBP) connections. In an exemplary embodiment, a hub site PEP End Point 501 may have up to 16,000 peers to which it needs to establish backbone connections. For each PEP End Point peer, parameters are provided to indicate, for each priority, whether a backbone connection for the given priority should be created. At startup, the PEP End Point platform environment 210 parses the list of peers to which it needs to establish backbone connections. For each peer, the environment 210 allocates a peer index. In a remote site PEP End Point 503, the peer index may be set to zero (if there is only one peer). In a hub site PEP End Point 501, the peer index is the same index returned for the peer by an IP subnet hash 1207 used to determine if a destination IP subnet is known to not be local. The peer index is the same value used by the PEP End Point 210 routing function to find the information used to actually send IP packets to that destination IP subnet. The platform environment 210 then allocates a set of backbone connection handles for that peer, for example, by using the peer index as the high order 14 bits of the handle and the priority of the backbone connection as the two low order bits.

If TCP spoofing is globally disabled, no backbone connections are opened in TSK 280 or BPK 282. After startup, the platform environment 210 may call TSK 280 to add, change the parameters of, or delete a backbone connection. When the platform environment 210 calls TSK 280 to open (add) a backbone connection, the environment 210 provides a TCB for the backbone connection. The environment 210 allocates the TCB to allow for platform specific memory management of the TCBs. For example, an IP Gateway may support up to 16,000 remote site PEP End Point peers (since an IP Gateway can currently support up to 16,000 remote IP subnets) and 64,000 backbone connections. Therefore, up to 64,000 TCBs may be required. On the other hand, a Multimedia Relay, Multimedia VSAT or PES Remote is likely to only have a few PEP End Point peers and, thus, only a few TCBs. Therefore, the IP Gateway implementation of TCB management is likely to be more complex than the Multimedia Relay, Multimedia VSAT or PES Remote implementation of TCB management.

The handle 1205 is passed by the environment 210 to TSK 280 (FIG. 2) when the backbone connection is referenced (either directly or by way of a TCP connection's CCB). The handle 1205 is also passed to TSK 280 by the PEP Backbone Protocol Kernel 282 whenever a TSK message is received from the handle's backbone connection. And, the handle is also used as the TSK backbone connection identifier (TID) used as the source connection ID value in TSK messages sent to the TSK peer. A TCB 1203 is used to store the configuration information that is passed to the TCP Spoofing Kernel 280 by the platform environment 210 about the backbone connection. It also includes the backbone connection's current state (UP or DOWN) and a pointer to the head and tail of the linked list of CCBs belonging to TCP connections which are currently using the backbone connection. Access to the list of CCBs is required in order to find the TCP connections which are affected when backbone connections fail or are deleted.

As mentioned above, Connection control blocks (CCBs) are used to store information related to specific TCP connections. CCBs are managed by the platform environment 210 because many details of their management are platform specific. The platform environment provides mechanisms for allocating and deallocating CCBs and a function for mapping a received TCP segment to its corresponding CCB. When a TCP segment is passed to the TCP Spoofing Kernel 280, the environment 210 passes a pointer to the appropriate CCB to TSK along with the TCP segment. The mapping of received TSK messages to CCBs, however, is done by TSK itself.

In order for a TCP connection to be spoofed, a CCB must be available in both TSK peers. Ideally, the number of CCBs will be large enough to ensure that all TCP connections which the operator desires to be spoofed can be spoofed. In practice, the memory constraints of some of a PEP End Point platform may limit the number of CCBs such that occasionally a TCP connection cannot be spoofed because no CCB is available. When a TCP connection which should be spoofed cannot be spoofed because of a lack of CCB, an appropriate statistic is incremented and the TCP connection is carried unspoofed. TSK peers exchange information on the number of CCBs available for spoofed TCP connections using a particular backbone connection at startup (and whenever parameters change or the backbone connection restarts) via TSK Peer Parameters messages. The smaller value of the two TSK peers is then used as the limiting value for that backbone connection. Both TSKs track the number of CCBs currently allocated (per backbone connection). If a new TCP connection is detected but the current number of CCBs allocated (for this backbone connection) is at the "negotiated" limit, the TCP Spoofing Kernel 280 treats the connection as if no CCB is available (even if one is). Because of propagation delay or because the PEP End Point is sharing its pool of CCBs among all of its peers, it is possible for a CCB to be available when a TCP <SYN> segment is received by a TCP Spoofing Kernel 280 but for a corresponding CCB to not be available at the TSK peer.

Unlike TCBs 1203 which can be accessed via the TCB mapping table 1201 for TCP segments that are received from the local LAN and for TSK messages received from a backbone connection, connection control blocks require different mechanisms for being accessed via TCP segments versus TSK messages. CCBs that are not currently associated with any TCP connection are stored by the platform environment 210 in a CCB free pool.

Free CCBs are stored using one of two platform dependent methods. The first method is a pool of memory from which CCBs are created using a malloc( ) function or equivalent. With this method, the number of free CCBs is simply tracked numerically or via the amount of buffer space set aside for use in creating CCBs. CCBs are returned to the free pool using a free( ) function or equivalent. The second method is by means of a FIFO queue. With this method, all of the CCBs are created at platform startup and then chained together using their "next CCB" pointers. A CCB is allocated by removing it from the head of the FIFO queue and a CCB is freed by placing it at the end of the FIFO queue. A CCB that is associated with a TCP connection is considered active.

Figure 13:
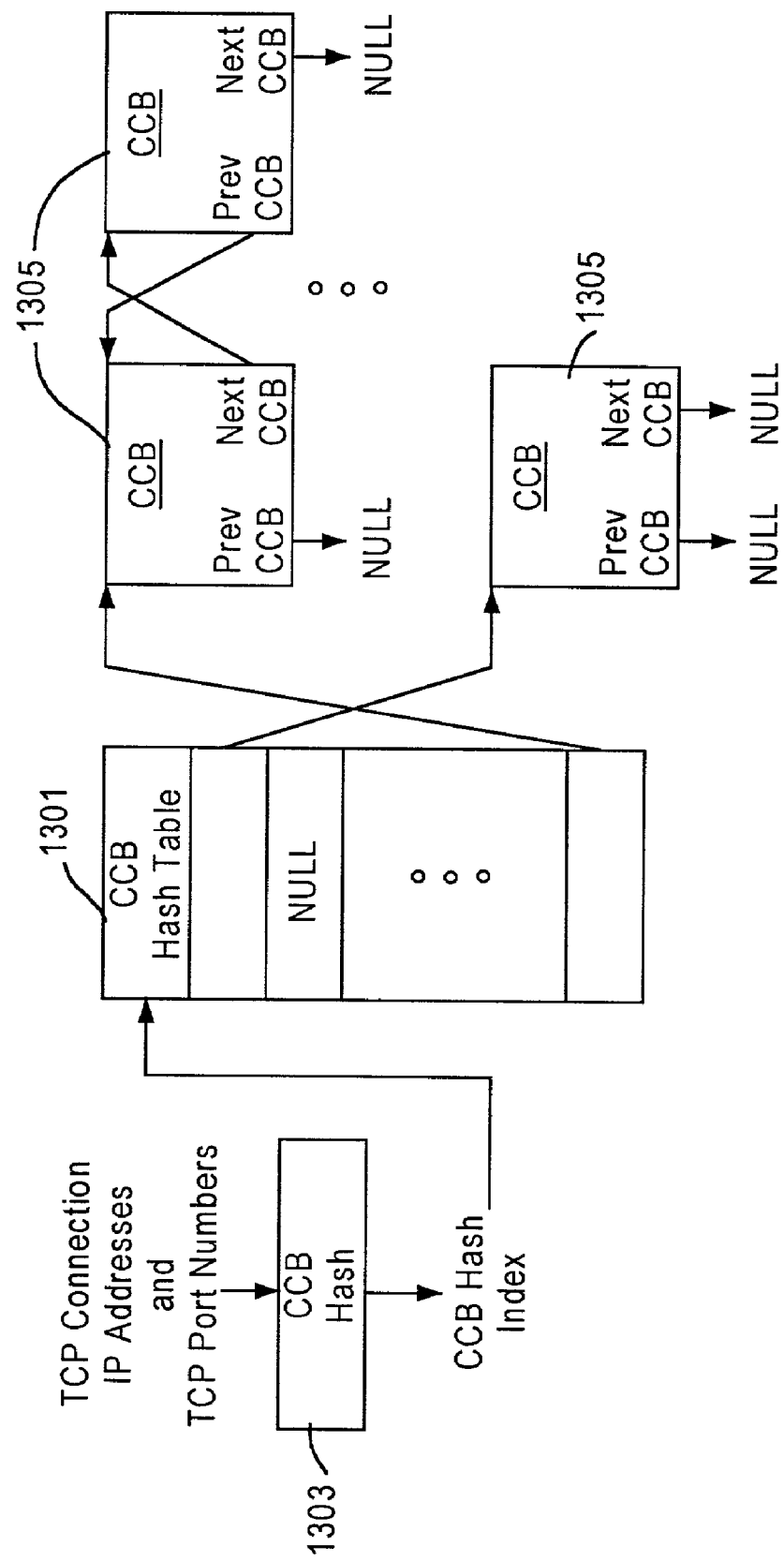
FIG. 13 is a diagram of a TCP connection control block (CCB) access via a CCB hash function, according to an embodiment of the present invention.

FIG. 13 shows a diagram of a CCB access via a CCB hash function, according to an embodiment of the present invention. Active CCBs are referenced in two ways. For mapping TSK messages received from its TSK peer to CCBs, TSK 280 uses a CCB mapping table 1301. The CCB mapping table 1301 is also used by TSK 280 in a round robin fashion to access CCBs to check for TCP connection timeouts. For mapping TCP segments received from the local host to CCBs, a CCB hash function 1303 is used to find CCB pointers. The CCB hash function 1303 is also used, in some cases, to find CCBs 1305 for received TSK messages when the CCB mapping table 1301 cannot be used.

When a TCP segment is received from the local LAN, the CCB hash function 1303 is employed to determine the CCB associated with the segment's TCP connection. The hash function 1303 produces an index into the CCB hash table 1301. The CCB hash table 1301 points to a doubly linked list of CCBs 1305, which match the hash value. Each CCB 1305 includes a "next CCB" pointer field and a previous CCB pointer field which are used by the platform environment 210 to implement the doubly linked list, for example. A doubly linked list is used to support efficient removal of CCBs from the middle of a hash function chain.

The maintenance of the CCB pointers that are used by the hash function 1303 is the responsibility of the platform environment 1303. The platform environment 210 simply passes a pointer to the appropriate CCB 1305 to the TCP Spoofing Kernel 280 along with a TCP segment it passes to TSK 280. The environment 210 also provides a function call interface which TSK 280 can call to use the hash function 1303 itself. This interface is used by TSK 280 to find a CCB using the information in the TCP connection header of a received TSK message. The fact that the platform environment 210 is responsible for managing the CCB hash table 1301 indicates that the environment 210 must have access to some of the fields in the CCB 1305. To keep the environment from needing to know the complete format of the CCB 1305, the fields in the CCB which are accessible to the environment 210 are placed at the front of the CCB 1305. The environment 210 is responsible for maintaining the following CCB fields: the next and previous CCB pointers; the IP addresses and TCP port numbers, which uniquely identify the TCP connection; and the backbone connection handle used to map to the TCB of the backbone connection being used to carry this spoofed TCP connection, i.e. the TID of the peer. The next and previous CCB pointers may be kept by the platform environment 210 in a header prepended to the CCB to hide them from TSK 280. The TCP connection IP addresses and port numbers and the TID are written into the CCB 1305 by the environment 210. TSK 280 reads these values out of the CCB 1305, but does not write these values into the CCB 1305.

In general, the IP addresses and TCP port numbers of received TCP segments are used as input into the CCB hash function 1303. However, the hash function 1303 used is platform specific. For example, because a large number of TCP connections to different remote sites may be supported, the IP Gateway hash function 1303 needs to give emphasis to the subnet portion of the IP addresses. However, the subnet portion of the IP addresses are likely to be the same for all of the TCP connections associated with a particular remote site. Therefore, a remote site platform environment may need to give more emphasis to the host part of the IP addresses.

CCBs are allocated and deallocated by the TCP Spoofing Kernel 280 via function calls to the platform environment 210. The CCB mapping table 1301, which is created and maintained by TSK 280, is used to access CCBs for purposes of timer processing and when TSK messages are received from the PEP Backbone Protocol Kernel 282. A single mapping table 1301 is used to support all of the TSK peers. The size of the mapping table 1301 (and the number of CCBs required) is determined by the software build of the PEP End Point 210. In a given PEP End Point 210, the number of entries in the mapping table 1301 and the total number of CCBs 1305 available should be the same since TSK 280 cannot use a CCB which it cannot access via the mapping table 1301, and TSK 280 does not need mapping table entries into which it cannot place a CCB. In an exemplary embodiment, each entry in the mapping table 1301 includes two fields: a CCB pointer, and a next entry index. The next entry index is used to implement linked lists of CCBs. An index value of 0xFFFF is used as the equivalent of a NULL pointer. Two types of linked lists are maintained using the next entry index: a free entry list, and an active CCB list. The free entry list stores the list of free mapping table entries. TSK 280 maintains a pointer to the front and rear of the list and uses these pointers to implement a free entry FIFO queue. When a new CCB is allocated, an entry from the free entry list is also allocated. TSK 280 uses the index of the mapping table entry as the TCP connection's local TCP CID. When a CCB is deallocated, the CCB's mapping table entry is returned to the free list.

Active CCB lists are used to chain together the CCBs of active TCP connections. The CCBs 1305 of all of the TCP connections that are sharing a particular backbone connection are linked together. The indices for the first and last entries of a backbone connection's CCB linked list are stored with the backbone connection state in the TCB associated with the backbone connection. (Although the active CCB lists is discussed as being implemented as singly linked lists to conserve CCB mapping table 1301 space, doubly linked lists may alternatively be implemented to permit ease of removing entries from the middle of the list.

Active CCB lists are used for a number of purposes. First, the CCB lists are used to find all of the CCBs 1305 that are affected by the failure or deletion of a backbone connection. When a backbone connection fails or is deleted, all of the TCP connections using the backbone connection must be terminated. Another purpose is to find the appropriate CCB when a TSK message is received with a destination TCP CID value of 0xFFFF, but without a TCP connection header. For the latter case, TSK 280 traverses the active CCB list of the backbone connection from which the TSK message was received looking for a CCB 1305 with a peer CID equal to the source connection ID in the TSK message. A CCB 1305 that is removed from its active CCB list when the CCB 1305 is deallocated.

Figure 14:
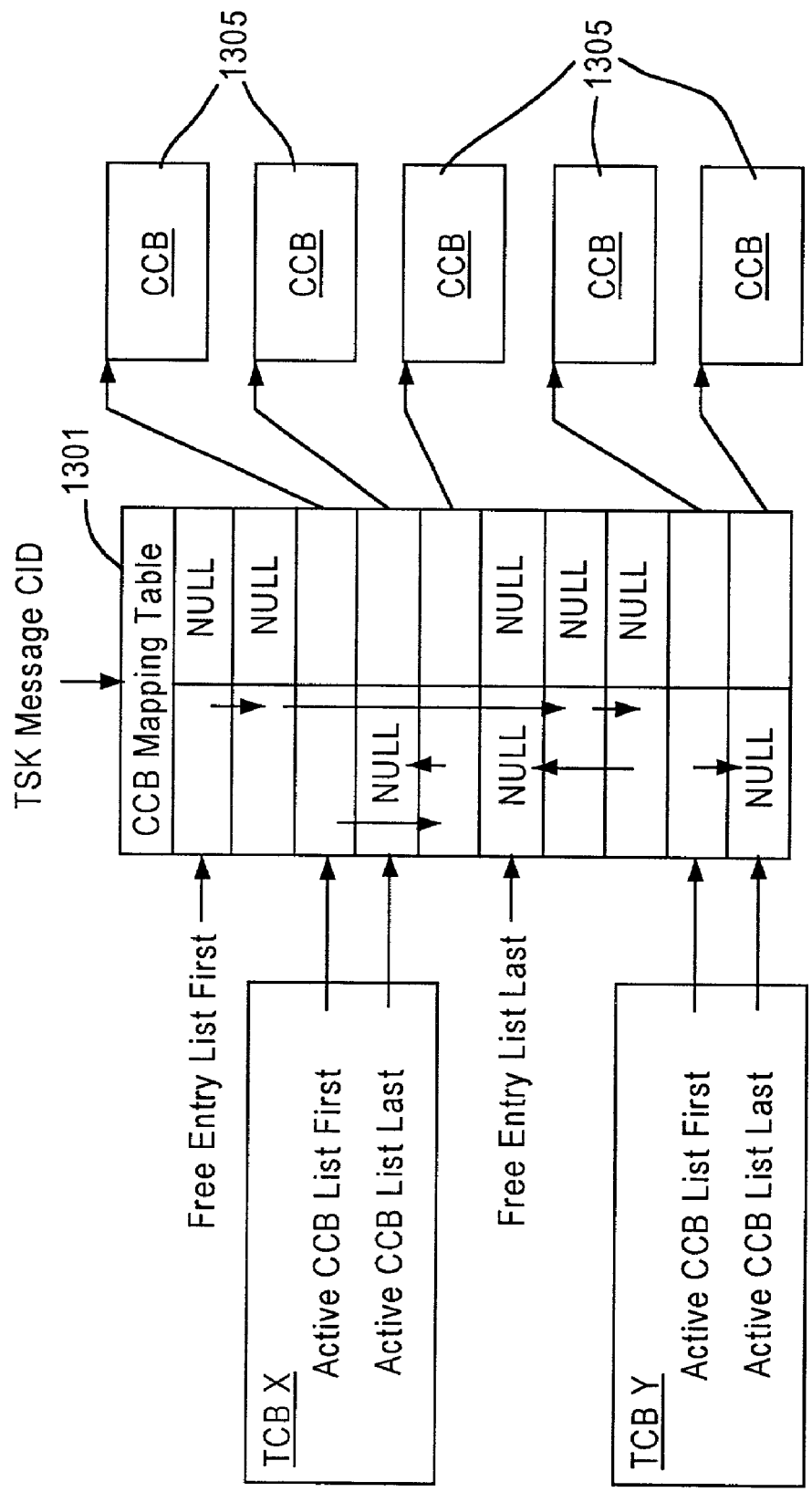
FIG. 14 is a diagram of a CCB mapping table, in accordance with an embodiment of the present invention.

FIG. 14 shows a diagram of a CCB mapping table, in accordance with an embodiment of the present invention. As discussed above, a CCB is allocated when a new TCP connection is detected that needs to be spoofed. The TCP Spoofing Kernel 280 allocates a free entry from the CCB mapping table 1301 and then calls the platform environment 210 to allocate the CCB, providing the IP addresses and TCP port numbers which uniquely identify the connection. The platform environment 210 allocates a CCB from the free CCB pool and uses the provided IP addresses and port numbers to determine the correct hash table entry for the CCB. The CCB pointer is then added to the hash table 1301 (chained to the end of any existing CCBs already mapped to this hash table entry in the event of a hash table collision). Finally, before passing the CCB back to TSK 280, the environment 210 fills in the CCB's TCB index value. When TSK 280 receives the CCB 1305, the TSK 280 uses the TCB index in the CCB to find the TCB. The CCB 1305 is then linked into the active CCB list for the backbone connection associated with the TCP connection's priority. When allocating a CCB 1305 for a new TCP connection detected from the local LAN, before actually placing the CCB 1305 into the CCB mapping array, TSK 280 first checks to make sure that the backbone connection is up. If the backbone connection is down, the connection cannot be spoofed and the CCB 1305 for the connection is returned to the environment 210. When a CCB 1305 is deallocated, it is dequeued from its active CCB list, its CCB mapping table entry is returned to the free entry list and the CCB 1305 is returned to the environment 210. The environment 210, in turn, removes the CCB 1305 from the CCB hash table 1301 and returns the CCB 1301 to the free CCB pool.

The total number of CCBs 1305 that are available in a PEP End Point platform 210 is configurable. The value may be specified in terms of the number of CCBs that are available per PEP End Point peer, as part of a PEP End Point profile. However, each PEP End Point platform software build possesses a certain maximum number of CCBs it can support. Two models of CCB pool handling may be utilized: a shared CCB pooling model and a dedicated CCB pooling model. The shared model involves sharing the CCB pool among all of the peers, while the dedicated model provides a single CCB pool per peer. Under the dedicated CCB pool model, if the operator configures the number of CCBs 1305 to be larger than the number supported by the software build, the smaller number will be used. With respect to the shared model, the operator may intentionally configure the per peer CCB limit such that multiplying the limit by the number of peers would require more CCBs than actually exist to improve performance by statistically sharing the CCBs. Having the number of CCBs in a PEP End Point be configurable allows the operator to control the point at which TCP connections stop being spoofed. The total number of TCP connections being carried by the system can reach a point where the total amount of bandwidth divided by the number of TCP connections actively using it is less than the throughput possible for each TCP connection without TCP spoofing. Therefore, the operator may want to set the number of CCBs such that spoofing only occurs when performance is improved.

(However, TCP spoofing performance improvement is not limited to just high data throughput. TCP spoofing can include spoofing the TCP three-way handshake. Depending on the applications being used, the operator may decide that spoofing the three-way handshake is useful even when throughput is limited by the presence of a large number of TCP connections. In addition, for spoofed TCP connections, when resources (e.g., buffer space) are low, flow control can be applied to spoofed TCP connections (by shrinking the TCP windows being advertised by the PEP End Point). This is not possible for unspoofed TCP connections.) In addition to the total number of PEP End Point CCBs, the operator can also configure the percentage of available CCBs which can be used with each priority backbone connection. This allows the operator to reserve CCBs for use by higher priority TCP connections.

Figure 15:
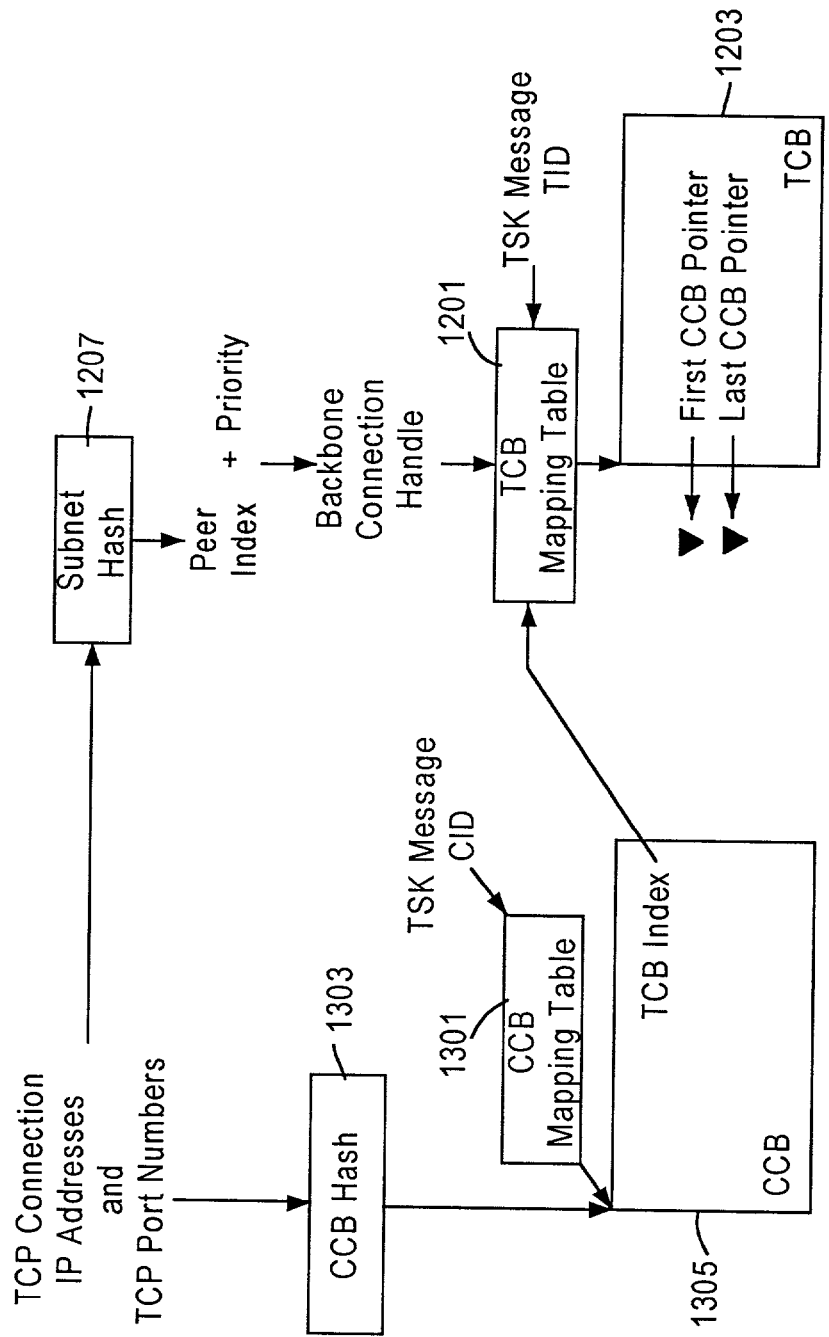
FIG. 15 is a diagram of the mapping between CCBs and TCBs, according to one embodiment of the present invention.

FIG. 15 shows the mapping between CCBs and TCBs, according to one embodiment of the present invention. When a TCP segment is received from the local LAN, the platform environment 210 uses the CCB hash function 1303 to find the CCB associated with the TCP connection and passes a pointer to this CCB 1305 to the TCP Spoofing Kernel 280 along with the TCP segment. An index into the TCB mapping array stored in the CCB is then used by TSK 280 when it needs to reference the TCB 1203 associated with the backbone connection being used to spoof the TCP connection. For a TCP segment received from the local LAN, TSK 280 need not access the TCB 1203 first to find the connection's CCB 1305. When a TSK message is received from the Backbone Protocol Kernel 282 by TSK 280, TSK 280 extracts the destination TCP CID from the TSK message. If the TCP CID is not 0xFFFF, it will represent the CCB mapping table index for the CCB associated with the TCP connection of the TSK message. If the TCP CID is 0xFFFF, TSK 280 must determine if a new TCP CID is required (because the TSK message is a Connection Request message), if the message belongs to an existing TCP connection for which the TSK peer has not yet received the TCP CID or if the message should be discarded because neither of the previous two conditions apply. TSK first checks the message to see if there is a TCP connection header included with the message. If a TCP connection header is included, TSK uses the information in the TCP connection header as input into the CCB hash function to find the CCB. If no TCP connection header is included in the message, TSK 280 searches the list of active CCBs currently associated with the backbone connection from which the message was received, searching for a match with the source TCP CID in the TSK message. BPK passes to TSK the handle required to find the appropriate TCB when it passes the TSK message to TSK.

Figure 16:
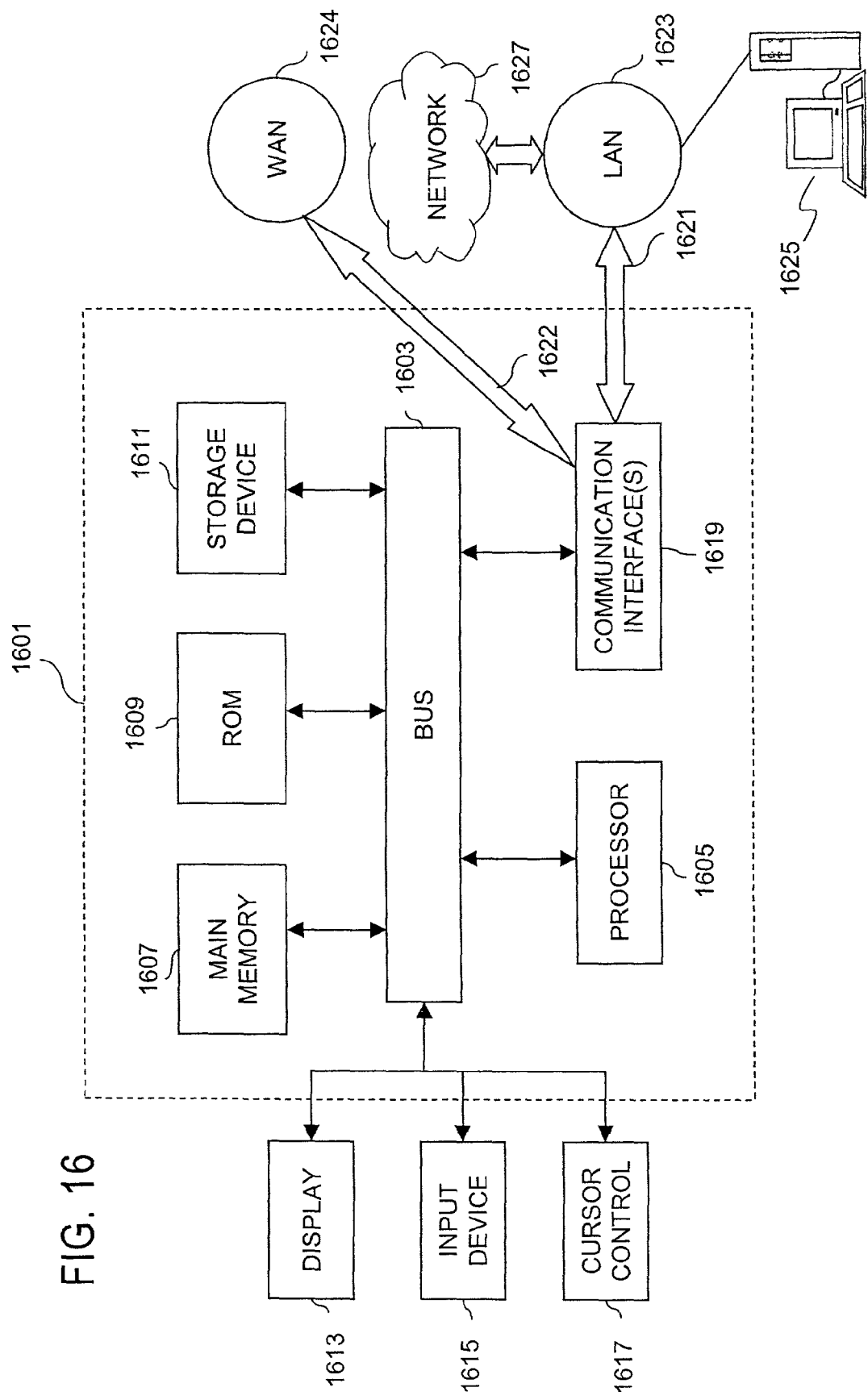
FIG. 16 is a diagram of a computer system that can perform PEP functions, in accordance with an embodiment of the present invention.
Figure 17:
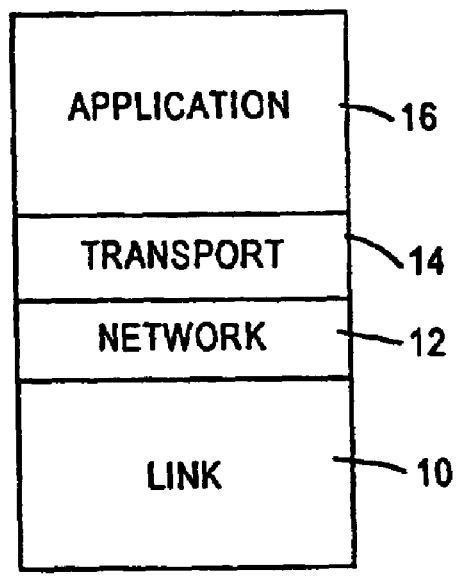
FIG. 17 is diagram of the protocol layers of the TCP/IP protocol suite.
Figure 18:
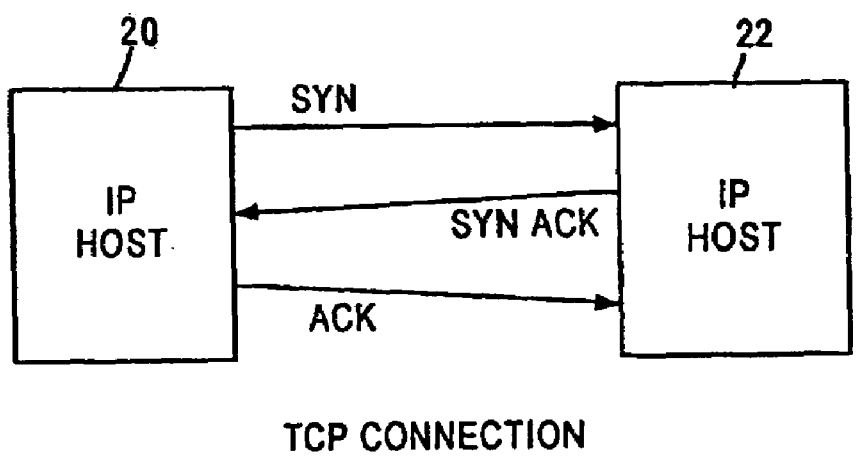
FIG. 18 is diagram of a conventional TCP three-way handshake between IP hosts.

FIG. 16 illustrates a computer system 1601 upon which an embodiment according to the present invention may be implemented. Such a computer system 1601 may be configured as a server to execute code that performs the PEP functions of the PEP end point 210 as earlier discussed. Computer system 1601 includes a bus 1603 or other communication mechanism for communicating information, and a processor 1605 coupled with bus 1603 for processing the information. Computer system 1601 also includes a main memory 1607, such as a random access memory (RAM) or other dynamic storage device, coupled to bus 1603 for storing information and instructions to be executed by processor 1605. In addition, main memory 1607 may be used for storing temporary variables or other intermediate information during execution of instructions to be executed by processor 1605. Notably, the PEP control blocks may be stored in main memory 1607. Computer system 1601 further includes a read only memory (ROM) 1609 or other static storage device coupled to bus 1603 for storing static information and instructions for processor 1605. A storage device 1611, such as a magnetic disk or optical disk, is provided and coupled to bus 1603 for storing information and instructions.

Computer system 1601 may be coupled via bus 1603 to a display 1613, such as a cathode ray tube (CRT), for displaying information to a computer user. An input device 1615, including alphanumeric and other keys, is coupled to bus 1603 for communicating information and command selections to processor 1605. Another type of user input device is cursor control 1617, such as a mouse, a trackball, or cursor direction keys for communicating direction information and command selections to processor 1605 and for controlling cursor movement on display 1613.

Embodiments are related to the use of computer system 1601 to perform the PEP functions of the PEP end point 210. According to one embodiment, this automatic update approach is provided by computer system 1601 in response to processor 1605 executing one or more sequences of one or more instructions contained in main memory 1607. Such instructions may be read into main memory 1607 from another computer-readable medium, such as storage device 1611. Execution of the sequences of instructions contained in main memory 1607 causes processor 1605 to perform the process steps described herein. One or more processors in a multi-processing arrangement may also be employed to execute the sequences of instructions contained in main memory 1607. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 1605 for execution the PEP functions of the PEP end point 210. Such a medium may take many forms, including but not limited to, non-volatile media, volatile media, and transmission media. Non-volatile media includes, for example, optical or magnetic disks, such as storage device 1611. Volatile media includes dynamic memory, such as main memory 1607. Transmission media includes coaxial cables, copper wire and fiber optics, including the wires that comprise bus 1603. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1605 for execution. For example, the instructions may initially be carried on a magnetic disk of a remote computer. The remote computer can load the instructions relating to execution of the PEP functions of the PEP end point 210 into its dynamic memory and send the instructions over a telephone line using a modem. A modem local to computer system 1601 can receive the data on the telephone line and use an infrared transmitter to convert the data to an infrared signal. An infrared detector coupled to bus 1603 can receive the data carried in the infrared signal and place the data on bus 1603. Bus 1603 carries the data to main memory 1607, from which processor 1605 retrieves and executes the instructions. The instructions received by main memory 1607 may optionally be stored on storage device 1611 either before or after execution by processor 1605.

Computer system 1601 also includes one or more communication interfaces 1619 coupled to bus 1603. Communication interfaces 1619 provide a two-way data communication coupling to network links 1621 and 1622, which are connected to a local area network (LAN) 1623 and a wide area network (WAN) 1624, respectively. The WAN 1624, according to one embodiment of the present invention, may be a satellite network. Communication interface 1619 may be a network interface card to attach to any packet switched LAN. As another example, communication interface 1619 may be an asymmetrical digital subscriber line (ADSL) card, an integrated services digital network (ISDN) card, a cable modem, or a modem to provide a data communication connection to a corresponding type of telephone line. Wireless links may also be implemented. In any such implementation, communication interface 1619 sends and receives electrical, electromagnetic or optical signals that carry digital data streams representing various types of information.

Network link 1621 typically provides data communication through one or more networks to other data devices. For example, network link 1621 may provide a connection through local area network 1623 to a host computer 1625 or to data equipment operated by an Internet Service Provider (ISP), shown as network 1627. ISP 1627 in turn provides data communication services through to the Internet. In addition, LAN 1623 can be linked to an intranet (not shown). The intranet, LAN 1623 and Internet all use electrical, electromagnetic or optical signals that carry digital data streams. The signals through the various networks and the signals on network link 1621 and through communication interface 1619, which carry the digital data to and from computer system 1601, are exemplary forms of carrier waves transporting the information.

Computer system 1601 can send messages and receive data, including program code, through the network(s), network link 1621 and communication interface 1619. In the Internet example, a server 1631 might transmit a requested code for an application program through Internet 505, ISP 1627, LAN 1623 and communication interface 1619. The received code may be executed by processor 1605 as it is received, and/or stored in storage device 1611, or other non-volatile storage for later execution. In this manner, computer system 1601 may obtain application code in the form of a carrier wave. Computer system 1601 can transmit notifications and receive data, including program code, through the network(s), network link 1621 and communication interface 1619.

The techniques described herein provide several advantages over prior approaches to improving network performance, particularly in a packet switched network such as the Internet. A local PEP end point and a remote PEP end point communicate to optimize the exchange of data through a TCP spoofing functionality. This arrangement advantageously improves performance of the communication network.

Obviously, numerous modifications and variations of the present invention are possible in light of the above teachings. It is therefore to be understood that within the scope of the appended claims, the invention may be practiced otherwise than as specifically described herein.

What is claimed is:

1. A network apparatus for performing functions to enhance performance of a communication network, comprising:
   a protocol spoofing module configured to selectively spoof a plurality of connections associated with a plurality of hosts based upon corresponding spoofing criteria and to provide local acknowledgement of received messages over the connections;
   a connection module configured to multiplex the plurality of connections over a common backbone connection;
   a prioritization module configured to prioritize access to the backbone connection based upon prioritization criteria;
   a path selection module configured to determine a path among a plurality of paths to transmit the received messages based upon path selection criteria; and
   a data compression module configured to apply compression on the backbone connection or to apply different compression schemes on individual ones of the plurality of connections.

2. The network apparatus according to claim 1, wherein the protocol spoofing module is configured to allocate a connection control block among a plurality of connection control blocks corresponding to a spoofed connection, each of the plurality of connection control blocks storing information related to the plurality of connections, wherein the quantity of connection control blocks is configurable.

3. The network apparatus according to claim 2, further comprising:
   a mapping table to store connection control block allocation information.

4. The network apparatus according to claim 2, further comprising:
   a hash function logic configured to output pointers corresponding to the plurality of connection control blocks.

5. The network apparatus according to claim 1, wherein the backbone connection is a satellite link, the apparatus further comprising:
   an encryption module configured to encrypt the satellite link.

6. The network apparatus according to claim 1, wherein the plurality of connections are established according to the Transmission Control Protocol (TCP).

7. The network apparatus according to claim 1, wherein the spoofing criteria includes at least one of Destination IP (Internet Protocol) address; Source IP address; TCP port numbers; TCP options; or IP differentiated services (DS) field.

8. The network apparatus according to claim 1, wherein the prioritization criteria includes at least one of Destination IP (Internet Protocol) address, Source IP address, IP next protocol, TCP (Transmission Control Protocol) port numbers, UDP (User Datagram Protocol) port numbers, or IP differentiated services (DS) field.

9. The network apparatus according to claim 1, wherein the prioritization module sets priority of one of the received messages, the one message being an IP (Internet Protocol) packet, wherein the path selection criteria includes at least one of the priority of the IP packet, Destination IP address, Source IP address, IP next protocol, TCP (Transmission Control Protocol) port numbers, UDP (User Datagram Protocol) port numbers, or IP differentiated services (DS) field.

10. A method for performing functions to enhance performance of a communication network, the method comprising:

selectively applying protocol spoofing to a plurality of connections associated with a plurality of hosts based upon corresponding spoofing criteria;

providing local acknowledgement of received messages over the connections;

multiplexing the plurality of connections over a common backbone connection;

prioritizing access to the backbone connection based upon prioritization criteria;

determining a path among a plurality of paths to transmit the received messages based upon path selection criteria; and applying data compression on the backbone connection or applying different compression schemes on individual ones of the plurality of connections.

11. The method according to claim 10, further comprising:

allocating a connection control block among a plurality of connection control blocks corresponding to a spoofed connection, each of the plurality of connection control blocks storing information related to the plurality of connections, wherein the quantity of connection control blocks is configurable.

12. The method according to claim 11, further comprising:

storing connection control block allocation information in a mapping table.

13. The method according to claim 11, further comprising:

outputting pointers corresponding to the plurality of connection control blocks.

14. The method according to claim 10, wherein the backbone connection in the multiplexing step is a satellite link, the method further comprising:

encrypting the satellite link.

15. The method according to claim 10, wherein the plurality of connections in the step of selectively spoofing are established according to the Transmission Control Protocol (TCP).

16. The method according to claim 10, wherein the spoofing criteria in the step of selectively spoofing includes at least one of Destination IP (Internet Protocol) address; Source IP address; TCP port numbers; TCP options; or IP differentiated services (DS) field.

17. The method according to claim 10, wherein the prioritization criteria in the prioritizing step includes at least one of Destination IP address, Source IP address, IP next protocol, TCP (Transmission Control Protocol) port numbers, UDP (User Datagram Protocol) port numbers, or IP differentiated services (DS) field.

18. The method according to claim 10, further comprising:

setting priority of one of the received messages, the one message being an IP (Internet Protocol) packet, wherein the path selection criteria in the includes at least one of the priority of the IP packet, Destination IP address, Source IP address, IP next protocol, TCP (Transmission Control Protocol) port numbers, UDP (User Datagram Protocol) port numbers, or IP differentiated services (DS) field.

19. A network apparatus for performing functions to enhance performance of a communication network, the network apparatus comprising:

selectively applying protocol spoofing to a plurality of connections associated with a plurality of hosts based upon corresponding spoofing criteria;

means for providing local acknowledgement of received messages over the connections;

means for multiplexing the plurality of connections over a common backbone connection;

means for prioritizing access to the backbone connection based upon prioritization criteria;

means for determining a path among a plurality of paths to transmit the received messages based upon path selection criteria; and means for applying data compression on the backbone connection or applying different compression schemes on individual ones of the plurality of connections.

20. The network apparatus according to claim 19, further comprising:

means for allocating a connection control block among a plurality of connection control blocks corresponding to a spoofed connection, each of the plurality of connection control blocks storing information related to the plurality of connections, wherein the quantity of connection control blocks is configurable.

21. The network apparatus according to claim 20, further comprising:

means for storing connection control block allocation information in a mapping table.

22. The network apparatus according to claim 20, further comprising:

means for outputting pointers corresponding to the plurality of connection control blocks.

23. The network apparatus according to claim 19, wherein the backbone connection is a satellite link, the apparatus further comprising:

means for encrypting the satellite link.

24. The network apparatus according to claim 19, wherein the plurality of connections are established according to the Transmission Control Protocol (TCP).

25. The network apparatus according to claim 19, wherein the spoofing criteria includes at least one of Destination IP (Internet Protocol) address; Source IP address; TCP port numbers; TCP options; or IP differentiated services (DS) field.

26. The network apparatus according to claim 19, wherein the prioritization criteria includes at least one of Destination IP address, Source IP address, IP next protocol, TCP (Transmission Control Protocol) port numbers, UDP (User Datagram Protocol) port numbers, or IP differentiated services (DS) field.

27. The network apparatus according to claim 19, wherein the prioritization module sets priority of one of the received messages, the one message being an IP (Internet Protocol) packet, wherein the path selection criteria includes at least one of the priority of the IP packet, Destination IP address, Source IP address, IP next protocol, TCP (Transmission Control Protocol) port numbers, UDP (User Datagram Protocol) port numbers, or IP differentiated services (DS) field.

28. A computer-readable medium carrying one or more sequences of one or more instructions for performing functions to enhance performance of a communication network, the one or more sequences of one or more instructions including instructions which, when executed by one or more processors, cause the one or more processors to perform the steps of:

selectively applying protocol spoofing to a plurality of connections associated with a plurality of hosts based upon corresponding spoofing criteria;

providing local acknowledgement of received messages over the connections;

multiplexing the plurality of connections over a common backbone connection;

prioritizing access to the backbone connection based upon prioritization criteria;

determining a path among a plurality of paths to transmit the received messages based upon path selection criteria; and applying data compression on the backbone connection or applying different compression schemes on individual ones of the plurality of connections.

29. The computer-readable medium according to claim 28, wherein the one or more processors further perform the step of:

allocating a connection control block among a plurality of connection control blocks corresponding to a spoofed connection, each of the plurality of connection control blocks storing information related to the plurality of connections, wherein the quantity of connection control blocks is configurable.

30. The computer-readable medium according to claim 29, wherein the one or more processors further perform the step of:

storing connection control block allocation information in a mapping table.

31. The computer-readable medium according to claim 29, wherein the one or more processors further perform the step of:

outputting pointers corresponding to the plurality of connection control blocks.

32. The computer-readable medium according to claim 28, wherein the backbone connection in the multiplexing step is a satellite link, and the one or more processors further perform the step of:

encrypting the satellite link.

33. The computer-readable medium according to claim 28, wherein the plurality of connections in the step of selectively spoofing are established according to the Transmission Control Protocol (TCP).

34. The computer-readable medium according to claim 28, wherein the spoofing criteria in the step of selectively spoofing includes at least one of Destination IP (Internet Protocol) address; Source IP address; TCP port numbers; TCP options; or IP differentiated services (DS) field.

35. The computer-readable medium according to claim 28, wherein the prioritization criteria in the prioritizing step includes at least one of Destination IP (Internet Protocol) address, Source IP address, IP next protocol, TCP (Transmission Control Protocol) port numbers, UDP (User Datagram Protocol) port numbers, or IP differentiated services (DS) field.

36. The computer-readable medium according to claim 28, wherein the one or more processors further perform the step of:

setting priority of one of the received messages, the one message being an IP (Internet Protocol) packet, wherein the path selection criteria in the includes at least one of the priority of the IP packet, Destination IP address, Source IP address, IP next protocol, TCP (Transmission Control Protocol) port numbers, UDP port numbers, or IP differentiated services (DS) field.

* * * * *